(12) United States Patent
Li et al.

(10) Patent No.: US 12,542,597 B2
(45) Date of Patent: Feb. 3, 2026

(54) TECHNIQUES FOR PRECODING AIR-TO-AIR SIDELINK COMMUNICATIONS

(71) Applicant: QUALCOMM Incorporated, San Diego, CA (US)

(72) Inventors: Qiaoyu Li, Beijing (CN); Kangqi Liu, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 18/264,916

(22) PCT Filed: Apr. 15, 2021

(86) PCT No.: PCT/CN2021/087392
§ 371 (c)(1),
(2) Date: Aug. 9, 2023

(87) PCT Pub. No.: WO2022/217526
PCT Pub. Date: Oct. 20, 2022

(65) Prior Publication Data
US 2024/0120986 A1    Apr. 11, 2024

(51) Int. Cl.
*H04B 7/08*    (2006.01)
*H04L 5/00*    (2006.01)
*H04W 72/25*   (2023.01)

(52) U.S. Cl.
CPC .......... *H04B 7/086* (2013.01); *H04L 5/0069* (2013.01); *H04W 72/25* (2023.01)

(58) Field of Classification Search
None
See application file for complete search history.

(56) References Cited

U.S. PATENT DOCUMENTS

2019/0327618 A1    10/2019  Li et al.
2022/0039080 A1*    2/2022  Khoryaev ............. H04W 4/025
(Continued)

FOREIGN PATENT DOCUMENTS

CA       2267184 A1    4/1998
CN     111865509 A    10/2020
(Continued)

OTHER PUBLICATIONS

Supplementary European Search Report—EP21936414—Search Authority—The Hague Jan. 2, 2025 (2103165EP).
(Continued)

*Primary Examiner* — Diane L Lo
(74) *Attorney, Agent, or Firm* — Holland & Hart LLP

(57) ABSTRACT

Methods, systems, and devices for wireless communications are described. A first user equipment (UE) may receive a message indicating geographic location information related to beamforming an air-to-air sidelink message via a sidelink channel. In some examples, a second UE may transmit the message or different as a message scheduling the sidelink message. The geographic directions to avoid when beamforming the sidelink message, or a combination thereof. The first UE may identify one or more precoding parameters based on the geographic location information. The first UE may transmit the air-to-air sidelink message to the second UE. The sidelink message may be precoded for transmission via a transmission beam using the one or more precoding parameters.

28 Claims, 17 Drawing Sheets

(56) References Cited

U.S. PATENT DOCUMENTS

2022/0104178 A1* 3/2022 Lee ...................... H04W 76/14
2023/0064231 A1* 3/2023 Haghighat ............ H04W 72/51

FOREIGN PATENT DOCUMENTS

| CN | 112534750 A | 3/2021 |
|---|---|---|
| WO | WO-2019036578 A1 | 2/2019 |
| WO | WO-2020033086 A1 | 2/2020 |
| WO | WO-2022198194 A1 | 9/2022 |

OTHER PUBLICATIONS

International Search Report and Written Opinion—PCT/CN2021/087392—ISA/EPO—Jan. 19, 2022 (2103165WO1).
VIVO: "Mechanism to Support Confined Sidelink Operation", 3GPP TSG-RAN WG2 Meeting #112-e, R2-2009835, Nov. 13, 2020 (Nov. 13, 2020), 6 Pages, The Whole Document.

* cited by examiner

TECHNIQUES FOR PRECODING AIR-TO-AIR SIDELINK COMMUNICATIONS

CROSS REFERENCE

The present Application is a 371 national stage filing of International PCT Application No. PCT/CN2021/087392 by LI et al. entitled "TECHNIQUES FOR PRECODING AIR-TO-AIR SIDELINK COMMUNICATIONS," filed Apr. 15, 2021, which is assigned to the assignee hereof, and which is expressly incorporated by reference in its entirety herein.

FIELD OF TECHNOLOGY

The following relates to wireless communications, including techniques for precoding air-to-air sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support air-to-ground communications, for example, between a base station and a UE (e.g., airplanes, satellites, and the like, among other examples of wireless devices). However, such systems may be deficient. For example, the systems may fail to support efficient sidelink communications between UEs.

SUMMARY

The described techniques relate to improved methods, systems, devices, and apparatuses that support techniques for precoding air-to-air sidelink communications. Generally, the described techniques may enable one or more devices in a wireless communications system to perform beamforming (e.g., precoding) based on location information as described herein. For example, a first user equipment (UE) may receive a message indicating geographic location information of a second UE. Additionally or alternatively, the first UE may receive a message indicating one or more directions to avoid when beamforming (e.g., a same message or a different message). The first UE may identify one or more precoding parameters based on the message. The one or more precoding parameters may be selected for transmitting a sidelink message using a particular transmission beam, such as over a particular azimuth sub-angular-spread and a particular elevation sub-angular-spread. The first UE may transmit a sidelink message with the second UE that is precoded for transmission in accordance with the transmission beam corresponding to the one or more precoding parameters. By beamforming the sidelink message towards the geographic location of the second UE, away from the one or more directions (e.g., a direction associated with a third UE), or both, the first UE may realize improved communications reliability and communications efficiency (e.g., a relatively high data throughput), reduced interference, or any combination thereof, among other advantages.

A method for wireless communications at a first UE is described. The method may include receiving a message indicating geographic location information related to beamforming an air-to-air sidelink message via a sidelink channel, identifying one or more precoding parameters based on the geographic location information, and transmitting, to a second UE via the sidelink channel, the air-to-air sidelink message that is precoded for transmission via a transmission beam using the one or more precoding parameters.

An apparatus for wireless communications at a first UE is described. The apparatus may include a processor, memory coupled with the processor, and instructions stored in the memory. The instructions may be executable by the processor to cause the apparatus to receive a message indicating geographic location information related to beamforming an air-to-air sidelink message via a sidelink channel, identify one or more precoding parameters based on the geographic location information, and transmit, to a second UE via the sidelink channel, the air-to-air sidelink message that is precoded for transmission via a transmission beam using the one or more precoding parameters.

Another apparatus for wireless communications at a first UE is described. The apparatus may include means for receiving a message indicating geographic location information related to beamforming an air-to-air sidelink message via a sidelink channel, means for identifying one or more precoding parameters based on the geographic location information, and means for transmitting, to a second UE via the sidelink channel, the air-to-air sidelink message that is precoded for transmission via a transmission beam using the one or more precoding parameters.

A non-transitory computer-readable medium storing code for wireless communications at a first UE is described. The code may include instructions executable by a processor to receive a message indicating geographic location information related to beamforming an air-to-air sidelink message via a sidelink channel, identify one or more precoding parameters based on the geographic location information, and transmit, to a second UE via the sidelink channel, the air-to-air sidelink message that is precoded for transmission via a transmission beam using the one or more precoding parameters.

In some examples of the method, apparatuses, and non-transitory computer-readable medium described herein, receiving the message may include operations, features, means, or instructions for receiving the message indicating the geographic location information that may be associated with the second UE.

In some examples of the method, apparatuses, and non-transitory computer-readable medium described herein, receiving the message may include operations, features, means, or instructions for receiving the message indicating the geographic location information that may be associated with a first direction to avoid when beamforming the air-to-air sidelink message.

In some examples of the method, apparatuses, and non-transitory computer-readable medium described herein, receiving the message may include operations, features, means, or instructions for receiving the message indicating the geographic location information that identifies a two dimensional zone identifier of the second UE, a three dimensional zone identifier of the second UE, one or more geo-coordinates of the second UE, an altitude level of the second UE, or any combination thereof.

In some examples of the method, apparatuses, and non-transitory computer-readable medium described herein, receiving the message may include operations, features, means, or instructions for receiving the message indicating the geographic location information that identifies a three dimensional zone identifier of the second UE and a size of a zone within a set of multiple zones defining a three dimensional air space.

In some examples of the method, apparatuses, and non-transitory computer-readable medium described herein, receiving the message may include operations, features, means, or instructions for receiving the message indicating the geographic location information that identifies a first altitude level of the second UE within a set of multiple different altitude levels of an air space.

In some examples of the method, apparatuses, and non-transitory computer-readable medium described herein, receiving the message may include operations, features, means, or instructions for receiving the message indicating the geographic location information that identifies an altitude difference between adjacent altitude levels within the air space.

In some examples of the method, apparatuses, and non-transitory computer-readable medium described herein, receiving the message may include operations, features, means, or instructions for receiving the message indicating the geographic location information that identifies a two dimensional zone identifier of the second UE and a first altitude level of the second UE within a set of multiple different altitude levels of an air space.

In some examples of the method, apparatuses, and non-transitory computer-readable medium described herein, receiving the message may include operations, features, means, or instructions for receiving the message indicating the geographic location information that identifies geo-coordinates of the second UE.

In some examples of the method, apparatuses, and non-transitory computer-readable medium described herein, receiving the message may include operations, features, means, or instructions for receiving the message indicating the geographic location information that identifies a first altitude level of the second UE within a set of multiple different altitude levels of an air space associated with the geo-coordinates.

Some examples of the method, apparatuses, and non-transitory computer-readable medium described herein may further include operations, features, means, or instructions for transmitting a geographic location information request to the second UE via the sidelink channel and receiving the message indicating the geographic location information based on the geographic location information request.

In some examples of the method, apparatuses, and non-transitory computer-readable medium described herein, receiving the message may include operations, features, means, or instructions for receiving the message indicating a first direction to avoid that identifies a two dimensional zone identifier, a three dimensional zone identifier, one or more geo-coordinates, an altitude level, or any combination thereof, associated with the first direction.

In some examples of the method, apparatuses, and non-transitory computer-readable medium described herein, receiving the message may include operations, features, means, or instructions for receiving the message indicating a speed of the second UE, a direction of the second UE, an expected location of the second UE, a trajectory of the second UE, or any combination thereof.

Some examples of the method, apparatuses, and non-transitory computer-readable medium described herein may further include operations, features, means, or instructions for transmitting a capability message indicating a first quantity of different directions that the first UE may be capable of simultaneously beamforming, a second quantity of different directions that the first UE may be capable of avoiding during beamforming, or both, where receiving the message may be based on the transmitted capability message.

In some examples of the method, apparatuses, and non-transitory computer-readable medium described herein, the capability message indicates an angular spread associated with the first quantity of different directions, the second quantity of different directions, or both, and the angular spread includes at least one of an azimuth sub-angular-spread and an elevation sub-angular-spread.

Some examples of the method, apparatuses, and non-transitory computer-readable medium described herein may further include operations, features, means, or instructions for communicating a grant via a sidelink connection with the second UE scheduling transmission of the air-to-air sidelink message.

Some examples of the method, apparatuses, and non-transitory computer-readable medium described herein may further include operations, features, means, or instructions for receiving a grant via an access link connection with a base station scheduling transmission of the air-to-air sidelink message.

Some examples of the method, apparatuses, and non-transitory computer-readable medium described herein may further include operations, features, means, or instructions for receiving the message that may be a radio resource control message that semi-statically configures the geographic location information, a downlink control information message that indicates the geographic location information, a medium access control (MAC) control element message that semi-statically configures the geographic location information, a report message from the second UE indicating the geographic location information, or any combination thereof.

A method for wireless communications at a second UE is described. The method may include transmitting, to a first UE, a message indicating geographic location information related to beamforming an air-to-air sidelink message via a sidelink channel and receiving, from the first UE via the sidelink channel, the air-to-air sidelink message that is precoded for transmission using one or more precoding parameters associated with the geographic location information.

An apparatus for wireless communications at a second UE is described. The apparatus may include a processor, memory coupled with the processor, and instructions stored in the memory. The instructions may be executable by the processor to cause the apparatus to transmit, to a first UE, a message indicating geographic location information related to beamforming an air-to-air sidelink message via a sidelink channel and receive, from the first UE via the sidelink channel, the air-to-air sidelink message that is precoded for transmission using one or more precoding parameters associated with the geographic location information.

Another apparatus for wireless communications at a second UE is described. The apparatus may include means for transmitting, to a first UE, a message indicating geographic location information related to beamforming an air-to-air sidelink message via a sidelink channel and means for receiving, from the first UE via the sidelink channel, the air-to-air sidelink message that is precoded for transmission using one or more precoding parameters associated with the geographic location information.

A non-transitory computer-readable medium storing code for wireless communications at a second UE is described. The code may include instructions executable by a processor to transmit, to a first UE, a message indicating geographic location information related to beamforming an air-to-air sidelink message via a sidelink channel and receive, from the first UE via the sidelink channel, the air-to-air sidelink message that is precoded for transmission using one or more precoding parameters associated with the geographic location information.

In some examples of the method, apparatuses, and non-transitory computer-readable medium described herein, transmitting the message may include operations, features, means, or instructions for transmitting the message indicating the geographic location information that may be associated with the second UE.

In some examples of the method, apparatuses, and non-transitory computer-readable medium described herein, transmitting the message may include operations, features, means, or instructions for transmitting the message indicating the geographic location information that may be associated with a first direction for the first UE to avoid when beamforming the air-to-air sidelink message.

In some examples of the method, apparatuses, and non-transitory computer-readable medium described herein, transmitting the message may include operations, features, means, or instructions for transmitting the message indicating the geographic location information that identifies a two dimensional zone identifier of the second UE, a three dimensional zone identifier of the second UE, one or more geo-coordinates of the second UE, an altitude level of the second UE, or any combination thereof.

In some examples of the method, apparatuses, and non-transitory computer-readable medium described herein, transmitting the message may include operations, features, means, or instructions for transmitting the message indicating the geographic location information that identifies a three dimensional zone identifier of the second UE and a size of a zone within a set of multiple zones defining a three dimensional air space.

In some examples of the method, apparatuses, and non-transitory computer-readable medium described herein, transmitting the message may include operations, features, means, or instructions for transmitting the message indicating the geographic location information that identifies a first altitude level of the second UE within a set of multiple different altitude levels of an air space.

In some examples of the method, apparatuses, and non-transitory computer-readable medium described herein, transmitting the message may include operations, features, means, or instructions for transmitting the message indicating the geographic location information that identifies an altitude difference between adjacent altitude levels within an air space.

In some examples of the method, apparatuses, and non-transitory computer-readable medium described herein, transmitting the message may include operations, features, means, or instructions for transmitting the message indicating the geographic location information that identifies a two dimensional zone identifier of the second UE and a first altitude level of the second UE within a set of multiple different altitude levels of an air space.

In some examples of the method, apparatuses, and non-transitory computer-readable medium described herein, transmitting the message may include operations, features, means, or instructions for transmitting the message indicating the geographic location information that identifies geo-coordinates of the second UE.

Some examples of the method, apparatuses, and non-transitory computer-readable medium described herein may further include operations, features, means, or instructions for receiving a geographic location information request from the first UE via the sidelink channel and transmitting the message indicating the geographic location information that may be a report message in response to the geographic location information request.

A method for wireless communications at a base station is described. The method may include transmitting, to a first UE, a message indicating geographic location information related to beamforming an air-to-air sidelink message via a sidelink channel and transmitting, to the first UE, a grant scheduling transmission of the air-to-air sidelink message from the first UE to a second UE via a sidelink channel.

An apparatus for wireless communications at a base station is described. The apparatus may include a processor, memory coupled with the processor, and instructions stored in the memory. The instructions may be executable by the processor to cause the apparatus to transmit, to a first UE, a message indicating geographic location information related to beamforming an air-to-air sidelink message via a sidelink channel and transmit, to the first UE, a grant scheduling transmission of the air-to-air sidelink message from the first UE to a second UE via a sidelink channel.

Another apparatus for wireless communications at a base station is described. The apparatus may include means for transmitting, to a first UE, a message indicating geographic location information related to beamforming an air-to-air sidelink message via a sidelink channel and means for transmitting, to the first UE, a grant scheduling transmission of the air-to-air sidelink message from the first UE to a second UE via a sidelink channel.

A non-transitory computer-readable medium storing code for wireless communications at a base station is described. The code may include instructions executable by a processor to transmit, to a first UE, a message indicating geographic location information related to beamforming an air-to-air sidelink message via a sidelink channel and transmit, to the first UE, a grant scheduling transmission of the air-to-air sidelink message from the first UE to a second UE via a sidelink channel.

DETAILED DESCRIPTION

Figure 1:
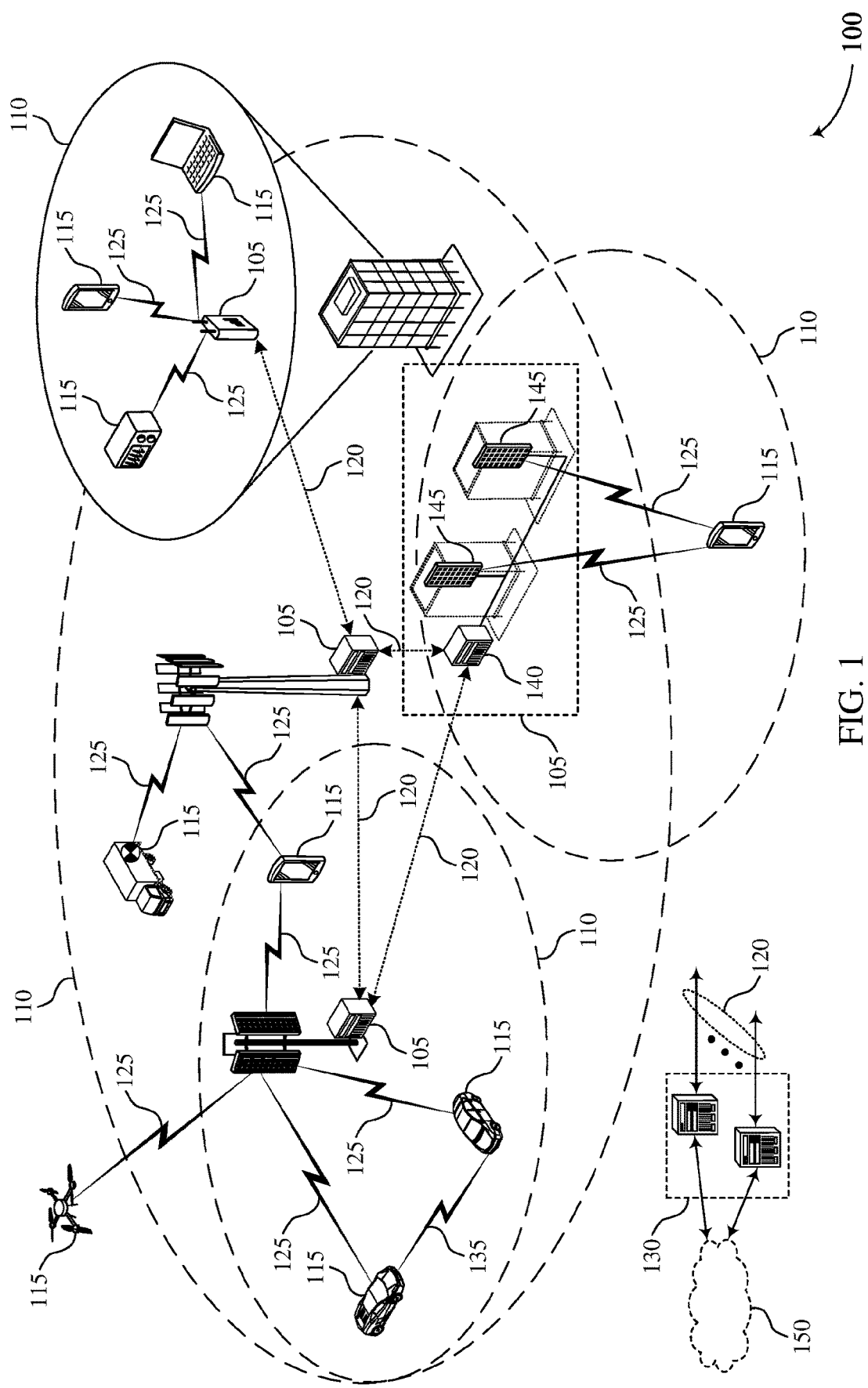
FIG. 1 illustrates an example of a wireless communications system that supports techniques for precoding air-to-air sidelink communications in accordance with aspects of the present disclosure.

Some wireless communications systems may support communications between a base station and a user equipment (UE). In some examples, the wireless communications systems may support air-to-ground communications between a base station and a UE (e.g., an airplane, a satellite, a drone, or other examples of wireless devices). However, in some cases such systems may fail to provide adequate coverage or may result in relatively frequent handover and/or relatively large transmission power from the base station. For example, due to large distances between a base station and one or more aircraft UEs, the base station may use relatively high transmission power or may be unable to achieve a desired data throughput.

In accordance with the techniques described herein, wireless communications systems may support air-to-air sidelink communications between airplane UEs. For example, a base station may establish an access link connection with a first UE (e.g., an aircraft UE, a drone, or other wireless device). The first UE may establish a sidelink connection with one or more other UEs (e.g., other airplanes), which may enable the first UE to forward communications from the base station, coordinate communications with the other UEs without relying on the base station, and the like. The described techniques may also enable the first UE to implement information for beamforming sidelink messages (e.g., precoding control information). For example, the first UE may use beamforming to transmit communications in a direction of one or more target UEs, avoid transmitting signal energy in undesired directions, or both, which may improve communications (e.g., decoding performance at a target UE), reduce interference, and the like. The information may include geographic location information of one or more UEs, one or more directions to avoid when beamforming, or any combination thereof. For example, a first UE (e.g., a transmitting UE) may receive a message indicating geographic location information of a second UE (e.g., a receiving UE). Additionally or alternatively, the first UE may receive a message indicating one or more directions to avoid when beamforming (e.g., the message may indicate a direction or location of a third UE to avoid for transmission to reduce interference at the third UE). The message may include a control message (e.g., from a base station), a report message (e.g., from the second UE), or any combination thereof. In some examples, a same message or different messages may indicate the one or more directions to avoid associated with the third UE and the geographic location information of the second UE.

In some examples, the message may indicate such beamforming information by identifying (e.g., indicating) a two dimensional (2D) zone identifier (ID), a three dimensional (3D) zone ID, one or more geo-coordinates, an altitude level, a speed or trajectory of one or more UEs, or any combination thereof, among other examples of beamforming or control information. In some examples, the first UE may communicate the message with a base station (e.g., Uu signaling via an access link), another UE (e.g., PC5 signaling via a sidelink), or any combination thereof. In some examples, the first UE may report a capability message indicating a capability of the first UE to communicate such information. In some examples, the first UE may request the beamforming information via a request message.

The first UE may transmit a sidelink message based on the control signaling. For example, the first UE may identify one or more precoding parameters (e.g., beamforming parameters) using the geographic location information, the one or more directions to avoid, or both. The first UE may be capable of generating multiple different transmission beams aimed in different directions. For example, the first UE may have a precoding codebook having a set of sequential precoders that each correspond to a respective set of one or more precoding parameters (e.g., a beam forming vector for generating a transmission beam in one of the different directions). The first UE may use the one or more precoding parameters for generating a transmission beam for beamforming a transmission of a sidelink message in a desired direction of the different directions. Thus, the first UE may beamform the sidelink message in the direction of a target UE, in a different direction of another UE (e.g., to reduce the likelihood of interference with the other UE), or both. By beamforming the sidelink message in accordance with such beamforming information, the first UE may realize improved communications reliability and communications efficiency (e.g., a relatively high data throughput), reduced interference, or any combination thereof, among other advantages.

Aspects of the disclosure are initially described in the context of wireless communications systems. Aspects of the disclosure are then described in the context of zone configurations and process flows. Aspects of the disclosure are further illustrated by and described with reference to apparatus diagrams, system diagrams, and flowcharts that relate to techniques for precoding air-to-air sidelink communications.

FIG. 1 illustrates an example of a wireless communications system 100 that supports techniques for precoding air-to-air sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may support techniques for precoding air-to-air sidelink communications. For example, the wireless communications system 100 may support ground-to-air communications, air-to-air communications, and the like. One or more of the wireless devices of the wireless communications system 100 may be provided with information for beamforming as described herein, which may be referred to as beamforming information, control information, location information, and the like. For example, a first UE 115 may receive a message indicating geographic location information of at least a second UE 115. Additionally or alternatively, the first UE 115 may receive a message indicating one or more directions to avoid when beamforming. The first UE 115 may identify one or more precoding parameters based on the received message. For example, the first UE 115 may transmit a sidelink message with the second UE 115 that is precoded for transmission in accordance with the geographic location information, the one or more directions to avoid, or a combination thereof. By beamforming the sidelink message towards the geographic location of the second UE 115, away from the one or more directions (e.g., a direction associated with a third UE 115), or both, the first UE 115 may realize improved communications reliability and communications efficiency (e.g., a relatively high data throughput), reduced interference, or any combination thereof, among other advantages.

Figure 2:
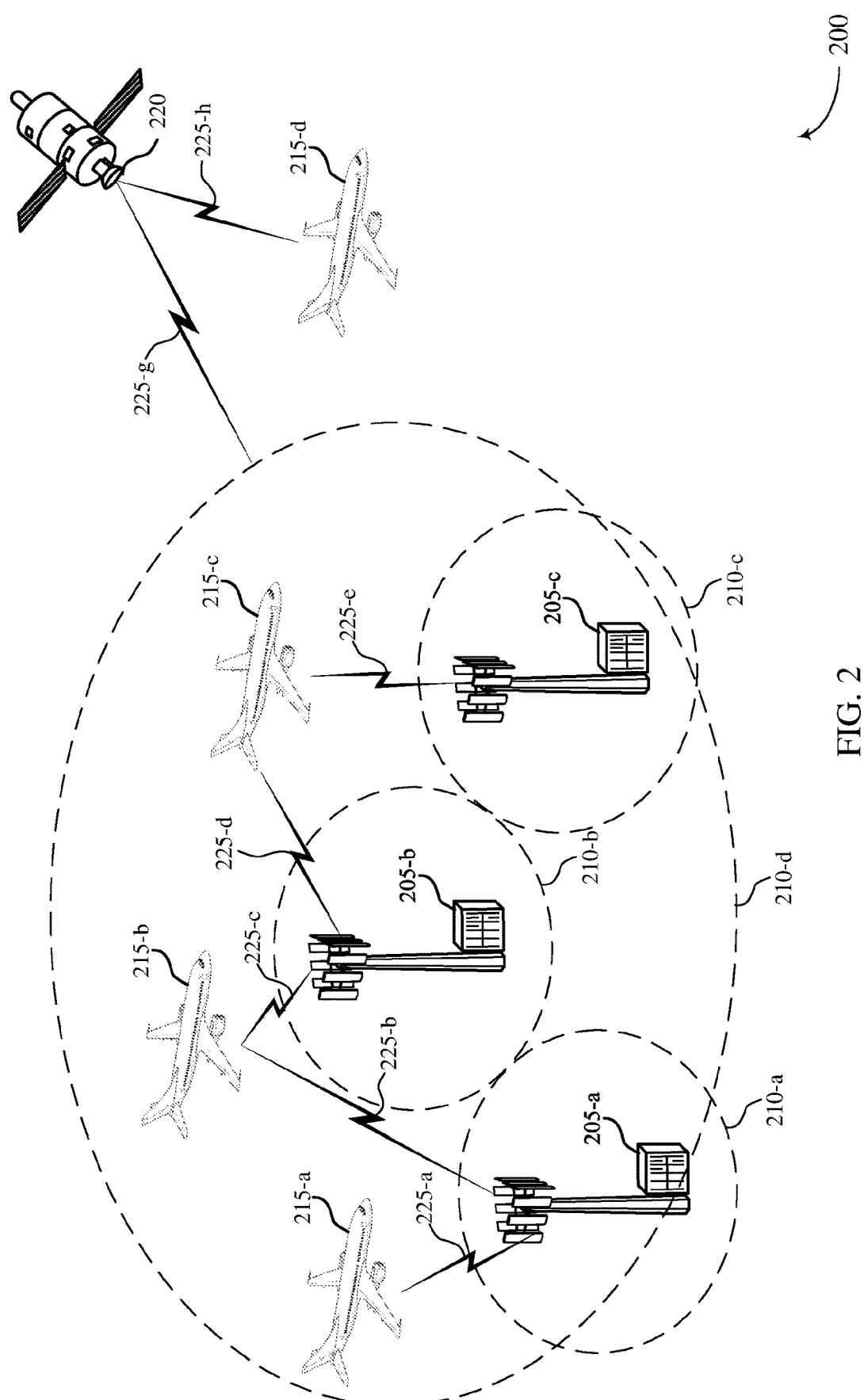
FIG. 2 illustrates an example of a wireless communications system that supports techniques for precoding air-to-air sidelink communications in accordance with aspects of the present disclosure.

FIG. 2 illustrates an example of a wireless communications system 200 that supports techniques for precoding air-to-air sidelink communications in accordance with aspects of the present disclosure. The wireless communications system 200 may implement aspects of the wireless communications system 100. For example, the wireless communications system 200 may include base stations 205 and UEs 215, which may be examples of a base station 105 and a UE 115 as described herein.

The base stations 205 may each correspond to a coverage area 210, which may be an example of a coverage area 110 as described herein with reference to FIG. 1. For example, the base station 205-*a* may serve a coverage area 210-*a*, the base station 205-*b* may serve a coverage area 210-*b*, and the base station 205-*c* may serve a coverage area 210-*c*. The base stations 205 may communicate with UEs 215 via one or more communication links 225. For example, the communication links 225 may be examples of communication links 125 as described herein with reference to FIG. 1. In some examples, the UEs 215 may be examples of airplanes or other wireless devices (e.g., drones, vehicles, or other examples of wireless communications devices).

The wireless communications system 200 may support various types of communications. For example, the wireless communications system 200 may support air-to-ground communications. In such communications, the base stations 205 may communicate with the UEs 215 via communication links 225. For example, in an in-land or coastal area, the base station 205-*a* may be on the ground and transmit communications via an antenna that is tilted up towards the UE 215-*a*. The UE 215-*a* may be an example of an aircraft UE and may receive the communications with an antenna pointing down (e.g., the UE 215-*a* may include antennas at the bottom of the UE 215-*a*). For example, an aircraft UE 215 antenna may be mounted at a bottom of the aircraft (e.g., antennas with beamforming capabilities). Such wireless communications may be relatively low cost, relatively high throughput, realize lower latency, or any combination thereof (e.g., compared to satellite communications with the satellite 220). In some examples, the wireless communications system 200 may support one or more traffic types (e.g., aircraft passenger communications, air traffic management communications, aircraft surveillance or maintenance communications, and the like).

Additionally or alternatively, the wireless communications system 200 may support communications with the satellite 220. For example, the satellite 220 may communicate with the UE 215-*d* (e.g., in an ocean area where the UE 215-*d* may be relatively far from the base station 205-*c*). The satellite may communicate with the network covered by the coverage area 210-*d*. For example, the base station 205-*c* may transmit or receive communications with the satellite 220, and the satellite 220 may transmit or receive communications with the UE 215-*d* via the communication link 225-*h*.

In some examples, the wireless communications system 200 may support time division duplex (TDD) or frequency division duplex (FDD) communications. For example, the wireless communications system may implement FDD communications in a non-terrestrial network (e.g., the wireless communications system 200). In some examples, the wireless communications system may support relatively large inter-site distance (ISD), relatively large coverage ranges, or a combination thereof. For example, in order to control the network deployment cost and account for a quantity of flights, a large ISD may be implemented (e.g., 100 kilometers (km), 200 km, or any other range). Additionally or alternatively, the distance between a UE 215 and a base station 205 may be relatively large (e.g., when a plane is above the sea, the distance may be more than 200 km or any other distance), and thus the wireless communications system 200 (e.g., an air-to-ground system) may be configured to provide a relatively large cell coverage (e.g., up to 300 km cell coverage or any other range).

In some examples, the wireless communications system 200 may deploy both air-to-ground communications and a terrestrial NR network. For example, interference between the terrestrial network and the non-terrestrial network may be relatively low and some operators may adopt a same frequency for deploying both networks (e.g., 4.8 GHz or any other frequency). In some examples, an air-to-ground terminal (e.g., a UE 215) may have a relatively large capacity. For example, an on-board air-to-ground terminal may be relatively more powerful than a mobile device UE (e.g., the terminal may have a higher effective isotropically radiated power (EIRP), larger transmission power, and/or larger on-board antenna gain than some terrestrial UEs). In some examples, the wireless communications system 200 may be configured as described herein to support relatively large cell coverage ranges, flight speeds (e.g., 1200 km/hour flight speeds, or other speeds), coexistence between air-to-ground networks and terrestrial networks, air-to-ground base station or UE core and performance thresholds, or any combination thereof. For example, the wireless communications system 200 may support one or more of a relatively large ISD, a relatively large timing advance (e.g., to avoid frequent handover and inter-cell interference), a relatively large per-cell throughput, a relatively high aircraft density, a relatively large doppler, a relatively large sub-carrier-spacing, a relatively short coherence time, a relatively fast timing advance drifting, various cyclic prefix lengths or waveforms (e.g., to support various propagation scenarios such as en-route, climbing, descending, take-off, parking, or landing of an aircraft, and the like).

In some examples, the air-to-ground or air-to-air communications may result in one or more link budgets. For example, the various devices may be configured to use a free space path loss when determining or estimating link budgets for one or more propagation scenarios (e.g., en-route, climb, or descent of an aircraft). Additionally or alternatively, the system may use a maximum path loss (MPL) that considers different frequency bands and different signal to noise ratios (SNRs). In some examples, the system may implement a relatively large amount of antenna elements, stronger antenna element gain, or both at a UE side (e.g., for 4.8 GHz or 3.5 GHz, or any other frequency range).

However, in some cases air-to-ground systems may fail to provide adequate coverage or may result in relatively frequent handover and/or relatively large transmission power from the base station 205. For example, the base station 205-c may be relatively far from the UE 215-d. The base station 205-c may use a relatively large transmission power to achieve a desired data throughput, or the base station 205-c may be unable to sufficiently cover the UE 215-d. Additionally or alternatively, the UEs 215 may experience relatively frequent handover between base stations 205.

In accordance with the techniques described herein, the wireless communications system 200 may support air-to-air communications. For example, the UEs 215 may communicate with each other via sidelinks (not shown). The UEs 215 may be enabled with beamforming information as described herein. For example, the UE 215-a may receive a message indicating geographic location information of the UE 215-b. Additionally or alternatively, the UE 215-a may receive a message indicating one or more directions to avoid when beamforming. In some examples, the UE 215-a may receive a same message or different messages if being indicated both the one or more directions and geographic location information. In some examples, the message may be an example of a control message. For example, the base station 205-a may transmit the control signaling to the UE 215-a indicating the geographic location information (e.g., the location of the second UE 215-b, one or more directions to avoid associated with another UE 215, or a combination thereof). In some examples, the message may be an example of a report message. For example, the UE 215-a may request the information from other UEs 215 via a sidelink channel, and the UE 215-b may transmit the report message to the UE 215-a.

The UE 215-a may identify one or more precoding parameters based on the beamforming information. For example, the UE 215-a may communicate a sidelink message with the UE 215-b that is precoded for transmission in accordance with the geographic location information, the one or more directions to avoid, or a combination thereof.

Figure 3:
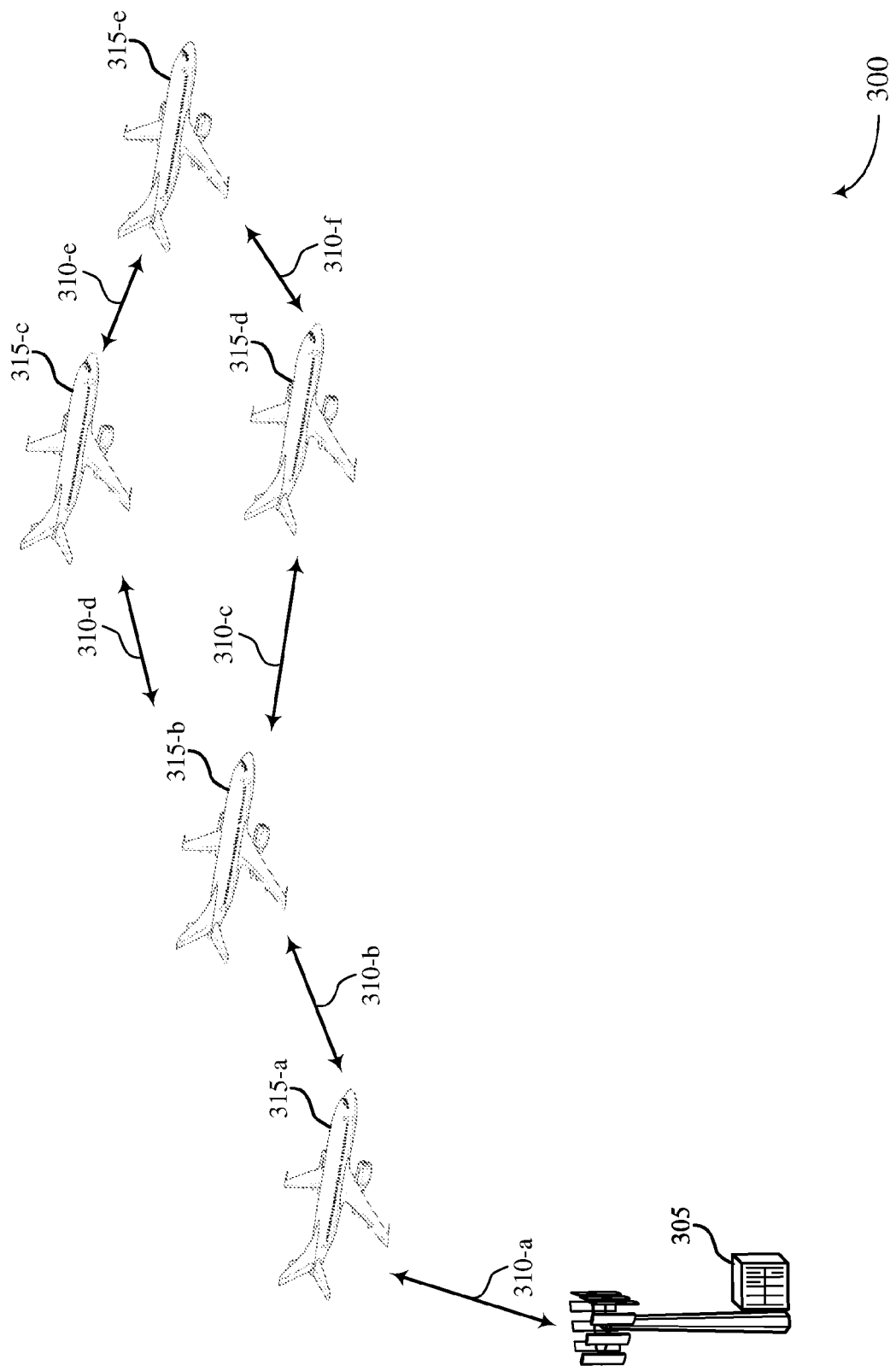
FIG. 3 illustrates an example of a wireless communications system that supports techniques for precoding air-to-air sidelink communications in accordance with aspects of the present disclosure.

FIG. 3 illustrates an example of a wireless communications system 300 that supports techniques for precoding air-to-air sidelink communications in accordance with aspects of the present disclosure. The wireless communications system 300 may implement aspects of the wireless communications system 100 or the wireless communications system 200. For example, the wireless communications system 300 may include a base station 305 and UEs 315, which may be examples of a base station 105 and a UE 115 as described herein. The wireless communications system 300 may illustrate an example of an air-to-air communications system as described herein.

The base station 305 may communicate with the UE 315-a via a communication link 310-a. The communication link 310-a may be an example of a communication link 125 as described with reference to FIG. 1. For example, the base station 305 may communicate with the UE 315-a via an access link (e.g., Uu communications). The UEs 315 may be examples of UEs 115 as described herein. For example, the UEs 315 may be examples of aircraft UEs 315 or other examples of wireless devices (e.g., drones, vehicles, mobile devices, or other examples of wireless communications devices).

The wireless communications system 300 may support sidelink communications with the UEs 315. For example, the UEs 315 may communicate via various communication links 310 which may be examples of sidelinks for air-to-air communications. In some examples, the communication links 310-b, 310-c, 310-d, 310-e, and 310-f may be examples of various PC5 links or other sidelinks. As an illustrative example, the UE 315-a may communicate with the UE 315-b via unicast communications, the UE 315-b may communicate with the UEs 315-c and 315-d via multi-cast communications, the UEs 315-c and 315-d may communicate with the UE 315-e via unicast communications with UE-cooperation (e.g., the UE 315-c and 315-d may transmit a same message on same resources to improve reception at the UE 315-e), or any combination thereof. While shown as various communication links for illustrative clarity, any such communication links may be used between any of the UEs 315, in addition or alternative to other examples of sidelinks and communications.

Thus, the wireless communications system 300 may support sidelink communications (e.g., NR sidelink based air-to-air communications). In some examples, the wireless communications system may support relatively large air-to-ground transmission power for relatively high throughput. In some examples, such sidelink communications may improve a throughput in the wireless communications system 300. For example, a sidelink based relay/repeater configuration of airplane UEs 315 as shown in FIG. 3 may enable the base station 305 to transmit at a reduced transmission power as compared to the transmission power required by base stations 205 in the air to ground configuration shown in FIG. 2, while also beneficially permitting the wireless communications system 300 to provide relatively high data throughput over a wide geographic coverage range (e.g., cell edge UEs 315 such as the UE 315-e may experience improved communications efficiency and reliability), or both, among other advantages. To provide similar performance, the base station 205 would have to transmit at a larger transmission power to achieve a similarly wide geographic coverage range and a similar high data throughput data. Transmitting at such high powers, however, may be prohibited by local regulations. In some examples, the sidelink communications may be configured to extend coverage to UEs 315 based on predetermined air-routes of the UEs 315. Additionally or alternatively, different aircrafts may be layered in different flight levels (FLs) (e.g., in a congested airspace), and the sidelink based multicast communications (or other sidelink communications) may improve reliability and throughput in the wireless communications system 300.

In some examples, the UEs 315 may support a relatively large quantity of antenna elements as described herein. In some examples, the antenna placement for air-to-air beamforming may be placed in various locations on the UE 315. For example, UE antenna elements may be mounted on the wings or tails of an aircraft UE 315, among other examples of areas that provide for horizontal beamforming, vertical beamforming, or both.

The wireless communications system 300 may support various sidelink operation modes. For example, in a first resource allocation mode (e.g., resource allocation mode 1), the base station 305 may schedule sidelink communications between the UEs 315 (e.g., physical sidelink shared channel (PSSCH) communications may be scheduled by downlink control information (DCI) such as DCI 3_0 or other DCI formats). In a second resource allocation mode (e.g., resource allocation mode 2), UEs 315 may coordinate to schedule sidelink communications. For example, UEs 315 may reserve resources from a sidelink resource pool for the communications. As an example, a UE 315 may transmit sidelink control information scheduling PSSCH communications to the other UEs 315.

In some examples, the wireless communications system 300 may support various reports, such as channel state information (CSI) reports. However, the CSI reports may fail to include precoding information. Techniques to provide beamforming information (e.g., precoding information) may be desired. For example, such information may enable UEs 315 with relatively higher beamforming capabilities or UEs 315 lining up in relatively predetermined air-routes (e.g., stabilized and line of sight topologies) to more efficiently beamform the sidelink communications, among other advantages.

In accordance with the techniques described herein, the airplane UEs 315 may be signaled with geographic location information of other airplane UEs for beamforming transmissions over a sidelink channel between the airplane UEs 315. For example, the UE 315-a may receive a message indicating geographic location information of the UE 315-b. Additionally or alternatively, the UE 315-a may receive a message indicating one or more directions to avoid when beamforming (e.g., a location or direction associated with the UE 315-d). In some examples, the UE 315-a may receive a same message or different messages. In some examples, the message may be an example of a control message. For example, the base station 305 may transmit control signaling via the communication link 310-a to the UE 315-a indicating the geographic location information (e.g., the location of the second UE 315-b, one or more directions to avoid associated with another UE 315, or a combination thereof). In some examples, the message may be an example of a report message. For example, the UE 315-a may request the geographic location information from one or more other UEs 315 via a sidelink channel (e.g., the UE 315-b may transmit a report message of the location of the UE 315-b, the UE 315-c may transmit an indication of a direction to avoid, or any combination thereof, to the UE 315-a in response to the request).

The UE 315-a may identify one or more precoding parameters based on the beamforming information. For example, the UE 315-a may communicate a sidelink message with the UE 315-b that is beamformed (e.g., precoded) for transmission in accordance with the geographic location information (e.g., direct a main beamforming lobe in the direction of UE 315-b), the one or more directions to avoid (e.g., place a beamforming null in one or more directions to avoid causing interference in such one or more directions), or a combination thereof. In some examples, beamforming may be an example of analog beamforming or digital beamforming (e.g., precoding) as described herein with reference to FIG. 1. In some examples, though the term precoding may be used for illustrative clarity, it is to be understood that other beamforming techniques may be used (e.g., precoding parameters may additionally or alternatively be referred to as beamforming parameters for analog beamforming).

Figure 4:
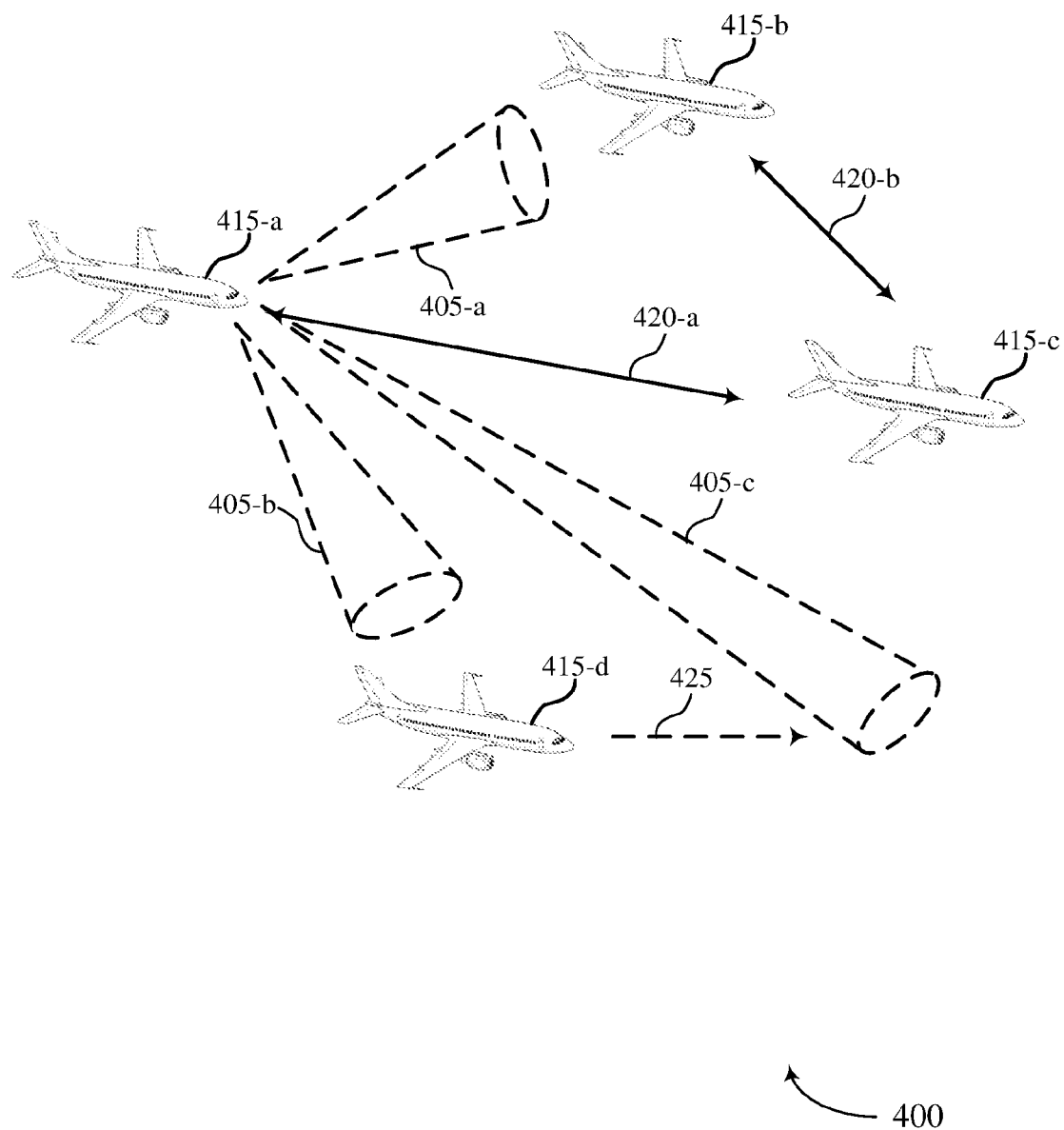
FIG. 4 illustrates an example of a wireless communications system that supports techniques for precoding air-to-air sidelink communications in accordance with aspects of the present disclosure.

FIG. 4 illustrates an example of a wireless communications system 400 that supports techniques for precoding air-to-air sidelink communications in accordance with aspects of the present disclosure. The wireless communications system 400 may implement aspects of the wireless communications system 100, the wireless communications system 200, or the wireless communications system 300. For example, the wireless communications system 400 may include UEs 415, which may be examples of a UE 115 as described herein.

The UE 415-a may communicate with the UE 415-b via a beam 405-a. The UE 415-a may communicate with the UE 415-d via a beam 405-b. The UE 415-a may communicate with the UE 415-c via a communication link 420-a and the UE 415-b may communicate with the UE 415-c via a communication link 420-b, which may be examples of sidelinks as described with reference to FIG. 3. In some examples, the UE 415-a may be referred to as a transmitting UE and the UEs 415-b and 415-c may be referred to as receiving UEs, although any UE 415 may be an example of a transmitting UE or a receiving UE as described herein.

The UE 415-a may receive beamforming information for precoding beams for communications with the other UEs 415. For example, the UE 415-a may receive a message indicating the beamforming information. In some examples, the beamforming information may include geographical location information. For example, the UEs 415 may be located in an airspace (e.g., an airspace as described with reference to FIG. 5). As an illustrative example, there may be various directions of difference between the UEs 415 (e.g., the UE 415-*a* may be 1.5 km in a horizontal distance from the UE 415-*b*, 0.6 km in a vertical distance from the UE 415-*b*, and 10 km in a horizontal distance from the UE 415-*c*, although any distance or quantity may be used).

In some examples, the UE 415-*a* may receive a control message from a base station via an access link (e.g., Uu signaling) indicating (e.g., identifying) the beamforming information (e.g., geographic location information, parameters for beamforming, speed or trajectory information, and the like). In some examples, the message may be a control message (e.g., DCI) that includes a grant scheduling a sidelink transmission. For example, the base station may transmit a control message scheduling resources for communication of a sidelink message between the UE 415-*a* and the UE 415-*b* (or the UE 415-*d* or both). In the control message or in another control message, the base station may indicate the beamforming information. For example, the base station may determine the location of the UE 415-*b* and indicate the geographic location information of the UE 415-*b* to the UE 415-*a* in the control message scheduling the PSSCH transmission or in another control message. Additionally or alternatively, the base station may determine the location of the UE 415-*c* and indicate the location information of the UE 415-*c* (e.g., the base station may include an indication of a location or direction for the UE 415-*a* to avoid beamforming to reduce interference at the UE 415-*c*). For example, UE 415-*c* may expect other sidelink or access link (e.g., Uu) transmissions within a same resource of the sidelink channel in which the UE 415-*a* is transmitting via beam 405-*a* to UE 415-*b*.

In some examples, the UE 415-*a* may be dynamically indicated such beamforming information (e.g., the location information for one or more target UEs 415, the location information for one or more UEs 415 to avoid, or a combination thereof). For example, a base station may transmit the control message as a DCI message or a medium access control (MAC) control element (CE) message to dynamically indicate the location of another UE 415. In some other examples, the UE 415-*a* may be semi-statically configured with such beamforming information. For example, the base station may configure the information via a MAC-CE message or a radio resource control (RRC) message. In some examples, the location information may additionally or alternatively include or configure the future trajectory of a UE 415 (e.g., speed, flight direction, a predicted future location, a current location, a time duration between the future location and the current location, or any combination thereof, among other examples of trajectory information). For example, the message may configure or indicate to the UE 415-*a* the trajectory 425 of the UE 415-*d*. The UE 415-*a* may beamform communications towards the UE 415-*d* based on the trajectory 425. For example, the UE 415-*a* may use a beam 405-*c* directed towards the expected next location of the UE 415-*d*. Additionally or alternatively, the message may configure or indicate a trajectory of the UE 415-*c* (e.g., such that the UE 415-*a* may avoid beamforming towards the UE 415-*c* and reduce interference). In some examples, such trajectory information may enable accurate beamforming, for example, when the UE 415-*a* is semi-statically configured with location information.

In some examples, the UE 415-*a* may report a capability message. For example, the UE 415-*a* may transmit a capability message to the base station (or another UE 415) indicating a capability associated with the beamforming information described herein. As an example, the capability message may indicate a quantity of receiving UEs 415 that may be signaled for such information (e.g., the number of UEs 415 that the UE 415-*a* may simultaneously beamform towards). Additionally or alternatively, the capability message may indicate a quantity of UEs 415 that the UE 415-*a* may beamform to avoid (e.g., a quantity of different directions or locations in which the UE 415-*a* may avoid when beamforming). In some examples, the capability message may include or indicate an angular spread (e.g., a 3D angular spread, a 2D angular spread, and the like) associated with the one or more quantities (e.g., a first angular spread associated with the quantity of possible target UEs 415, a second angular spread associated with the quantity of UEs 415 that the UE 415-*a* may avoid when beamforming, or both). In some examples, the angular spread may include an azimuth sub-angular-spread, an elevation sub-angular spread, or both.

In some examples, the UE 415-*a* may receive a control message or a report message from one or more other UEs 415 (e.g., PC5 signaling). For example, the UE 415-*a* may request such beamforming information (e.g., location information for a target UE 415-*b*, a direction to avoid associated with the UE 415-*c*, or a combination thereof) via a request message. The UE 415-*a* may receive the report message in response to the request message. For example, the UE 415-*b* may transmit the report message indicating the location information of the UE 415-*b*, the location information associated with the UE 415-*c* (e.g., one or more directions for the UE 415-*a* to avoid when beamforming), or a combination thereof. Additionally or alternatively, the UE 415-*c* may transmit an indication of the location information to the UE 415-*a* via the communication link 420-*a*. That is, the report message may be a same message or multiple messages. In some examples, the UE 415-*a* may receive a sidelink control message indicating the beamforming information. In some examples, in a same or different message, the UE 415-*a* may receive or transmit scheduling information associated with transmitting a sidelink message to another UE 415. For example, the UE 415-*a* may transmit sidelink control information scheduling a PSSCH transmission to the UE 415-*b* (e.g., the UE 415-*a* may unicast or broadcast a reservation of the resources for the PSSCH transmission). The UE 415-*a* may trigger a location information report (e.g., transmit the request message) using the same sidelink control information message or another message.

In some examples, the UE 415-*a* may receive additional or alternative beamforming information. For example, in addition or alternative to the location information of a target UE 415-*d*, the UE 415-*a* may receive trajectory information associated with the UE 415-*d* indicating the trajectory 425. Such information may be indicated in a same or different message as the location information of the UE 415-*d*. For example, the UE 415-*d* may report a flight speed, a direction, a predicted future location, a current location, a time duration between the future location and the current location, or any combination thereof (e.g., using a 2D signaling scheme or a 3D signaling scheme as described herein, such as 2D coordinates or zones, 3D coordinates or zones, or a combination thereof). As a first illustrative example, the UE 415-*d* may indicate an explicit flight speed, direction, or both to the UE 415-*a* (e.g., in addition to a current location of the UE 415-*d*). As another illustrative example, the UE 415-*d* may report a next expected location after a time-domain duration. For example, the UE 415-*d* may report a zone of the next location (e.g., a 2D zone ID or a 3D zone ID), geo-coordinates of the next location, a flight level (e.g., an altitude level) of the next location, or any combination thereof. In some examples, the reported next location may be associated with or relative to the current location of the UE 415-*d*. In some examples, the UE 415-*a* may determine the time duration between the current location and the future location based on a pre-configuration of the UE 415-*a*, an indication from the UE 415-*d* (e.g., the UE 415-*a* may indicate the time duration together with triggering of the UE 415-*d* to provide a location information report), or any combination thereof.

In some examples, such reported beamforming information (e.g., the location or direction of target UEs 415, the location or direction of UEs 415 to be avoided when beamforming, or the combination thereof) may be reported by a receiving UE 415 via MAC-CE messaging or RRC messaging through sidelink connections with the respective receiving UEs 415. For example, the UE 415-*d* may indicate beamforming information (e.g., geographic location information) via MAC-CE or RRC via a sidelink connection with the UE 415-*a*, among other examples of methods to carry such information.

In some examples, the one or more messages indicating the geographic location information may include or identify 2D zone IDs, 3D zone IDs, one or more geo-coordinates (e.g., Global Navigation Satellite System (GNSS) coordinates), an altitude level, a speed or trajectory, or any combination thereof, among other examples of location information. For example, the UE 415-*a* may receive a 2D zone ID, a 3D zone ID, an altitude level (e.g., a flight level indicating a distance above the ground), one or more geo-coordinates, or any combination thereof associated with a target UE 415 or a UE 415 to be avoided, although the location information of any quantity of target UEs or UEs to be avoided may be indicated by the one or more messages. Such zone configurations are described with more detail with reference to FIG. 5.

In some examples, multiple UE locations may be signaled as described herein. For example, the UE 415-*a* may receive an indication of a first location of the UE 415-*b* and a second location of the UE 415-*d*, or any quantity of UE locations. For instance, the UE 415-*d* may report location information of the UE 415-*d* and the UE 415-*b* may report location information of the UE 415-*b* (e.g., to the UE 415-*d*, to a base station, etc.), and the UE 415-*a* may receive the location information via an access link or a sidelink.

Thus, the UE 415-*a* may beamform the beams 405-*a*, 405-*b*, or both based on the beamforming information (although any quantity of beams, UEs 415, and the like may be used). For example, the UE 415-*a* may identify (e.g., determine) one or more beamforming parameters (e.g., precoding parameters) using the geographic location information of a target UE 415, a direction (e.g., of a UE 415) to be avoided, or a combination thereof. As an illustrative example, the UE 415-*a* may receive one or more messages indicating the location information of the UE 415-*a*, the location information of the UE 415-*c* (e.g., a first direction to be avoided to reduce interference), or a combination thereof. The UE 415-*a* may select precoding parameters to steer or aim the beam 405-*a* towards the UE 415-*b*, away from the UE 415-*c*, or both, which may improve a reliability of communications, reduce an effect of interference (e.g., the UE 415-*c* may be enabled to receive sidelink communications from the UE 415-*d* without interference from the UE 415-*a* transmitting to the UE 415-*b*), or a combination thereof, among other advantages. Stated alternatively, the UE 415-*a* may determine its precoder based on the location of a target UE 415-*b*, a location of a UE 415-*c* to be avoided, or both. For example, the UE 415-*a* may be capable of generating multiple different transmission beams 405 aimed in different directions. The UE 415-*a* may have a precoding codebook having a set of sequential precoders that each correspond to a respective set of one or more precoding parameters (e.g., a beam forming vector for generating a transmission beam 405 in one of the different directions). The UE 415-*a* may use the one or more precoding parameters for generating a transmission beam 405 for beamforming a transmission of a sidelink message in a desired direction of the different directions. As an example, the UE 415-*a* may transmit a sidelink message via the beam 405-*a* using the determined precoder (e.g., using the one or more identified precoding parameters).

Figure 5:
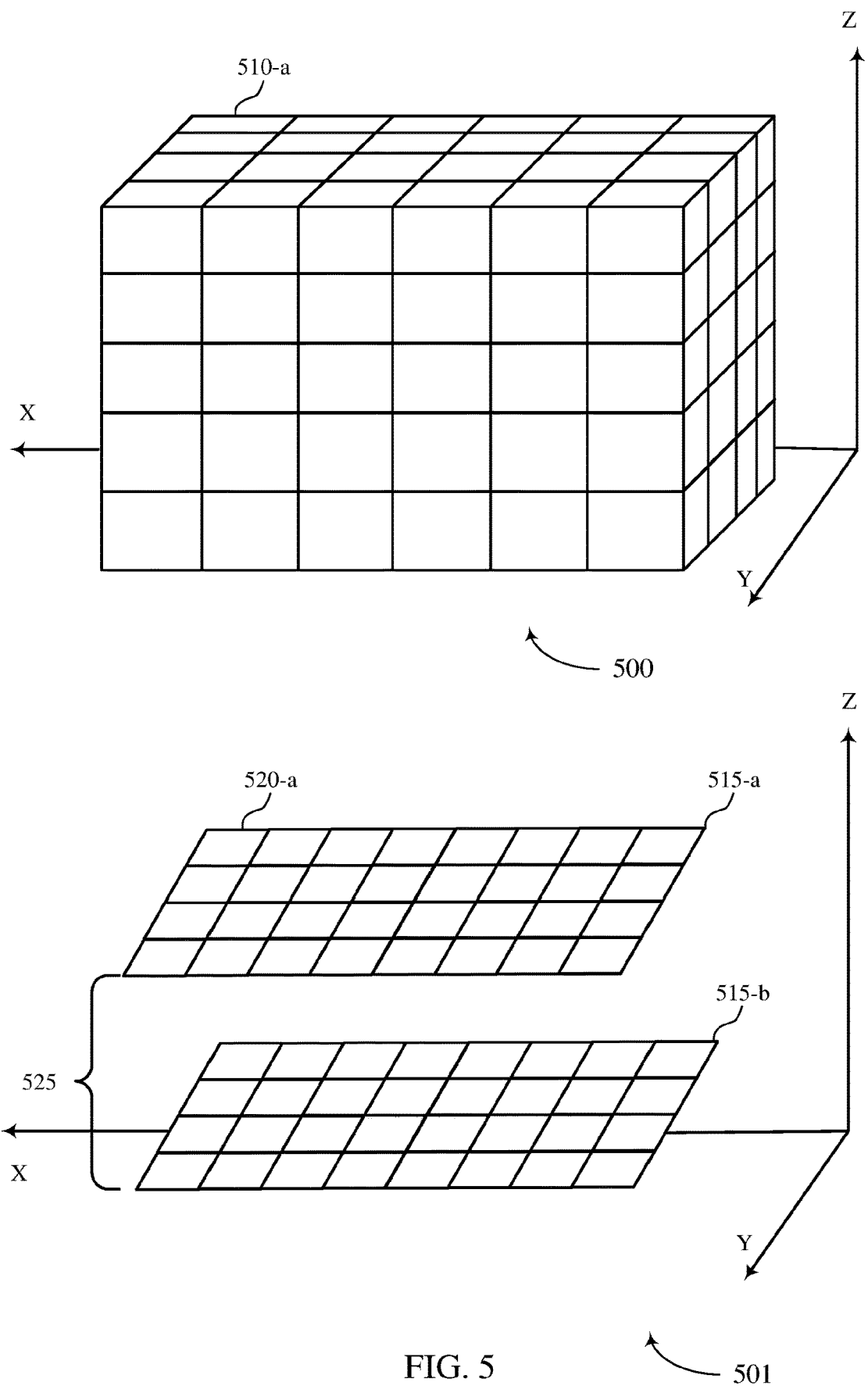
FIG. 5 illustrates examples of zone configurations that support techniques for precoding air-to-air sidelink communications in accordance with aspects of the present disclosure.

FIG. 5 illustrates examples of zone configurations 500 and 501 that support techniques for precoding air-to-air sidelink communications in accordance with aspects of the present disclosure. The zone configurations 500 and 501 may implement aspects of the wireless communications systems as described with reference to FIGS. 1-4. For example, the zone configurations 500 and 501 may represent airspaces divided into 3D zones or 2D zones, which may be used to indicate the geographic location information for a target UE or a UE to be avoided when beamforming as described herein.

The zone configuration 500 may illustrate an example of a 3D zone configuration. For example, the zone configuration may include 3D zones 510 that extend in three dimensions (e.g., an X direction, a Y direction, and a Z direction). The 3D zones 510 may be examples of cubes or other 3D shapes. As an illustrative example, the airspace covered by the zone configuration 500 may be defined by dividing the airspace into 3D cubes. The size of the 3D cubes may be configured at one or more UEs. For example, the UEs may be pre-configured with a size of the cubes, locations of the cubes (e.g., where the 3D airspace begins or end), or any combination thereof. Additionally or alternatively, such information may be configured via control signaling. For example, a UE may receive RRC messaging that configures a size of the 3D cubes, among other examples of control signaling.

The zone configuration 501 may illustrate an example of another 3D zone configuration implementing one or more altitude levels 515 (e.g., flight levels). For example, the zone configuration 501 may include 2D zones 520 that extend in two dimensions (e.g., a horizontal X direction and a horizontal Y direction). The zone configuration 501 may include one or more altitude levels 515 (e.g., flat levels FL). For example, a first altitude level 515-*a* may correspond to a first distance above the ground and a second altitude level 515-*b* may correspond to a second distance above the ground. In some examples, the difference 525 between adjacent pairs or altitude levels 515 may be preconfigured at a UE or indicated via control signaling (e.g., the difference 525 may be RRC configured in addition or alternative to the sizes of the 2D zones 520).

In some examples, the wireless communications system may support geo-coordinates for indicating a location of a UE within the airspace. For example, the geographic location information of a respective UE as described herein may include a 2D zone ID or a 3D zone ID (e.g., an ID of a 3D zone 510, an ID of a 2D zone 520 and an altitude level 515).

Additionally or alternatively, the geographic location information may indicate geo-coordinates (e.g., GNSS coordinates, global positioning system (GPS) coordinates, and the like), an altitude level 515, or a combination thereof, of a receiver UE, a direction to avoid, or both. Thus, a UE may be enabled to report, indicate, or determine geographic location information of one or more UEs using the location information described herein. For example, a transmitting UE may use the geographic location information (e.g., 2D zone IDs, 3D zone IDs, geo-coordinates, etc.) to determine in which direction to beamform transmission, in which direction to avoid when beamforming, or a combination thereof as described herein with reference to FIG. 4.

Figure 6:
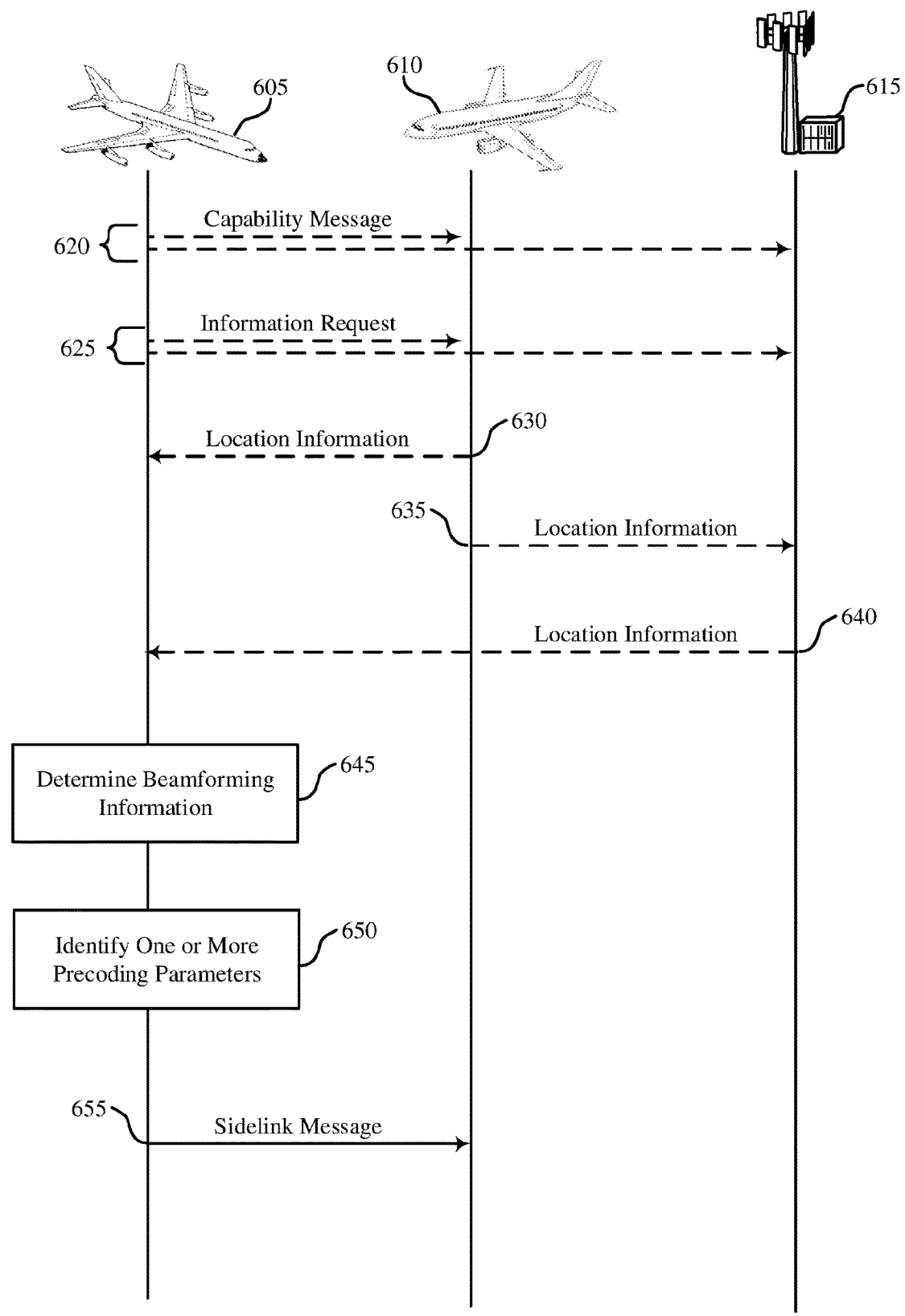
FIG. 6 illustrates an example of a process flow that supports techniques for precoding air-to-air sidelink communications in accordance with aspects of the present disclosure.

FIG. 6 illustrates an example of a process flow 600 that supports techniques for precoding air-to-air sidelink communications in accordance with aspects of the present disclosure. The process flow 600 may implement aspects of the wireless communications system 100, the wireless communications system 200, the wireless communications system 300, the wireless communications system 400, or any combination thereof as described with reference to FIGS. 1-4. In some examples, the process flow 600 may include example operations associated with a transmitting UE 605, a receiving UE 610, and a base station 615, which may be examples of corresponding devices described with reference to FIGS. 1-5. In the following description of the process flow 700, the operations between the UE 605, the UE 610, and the base station 615 may be performed in a different order than the example order shown, or the operations performed by the devices may be performed in different orders or at different times. Some operations may also be omitted from the process flow 600, and other operations may be added to the process flow 600.

In some examples, at 620 the UE 605 may transmit a capability message to the UE 610, the base station 615, or both. For example, the UE 605 may report a capability of the UE 605 to support beamforming information as described herein with reference to FIG. 4.

In some examples, at 625 the UE 605 may transmit an information request to the UE 610, the base station 615, or both. For example, the UE 605 may request location information from the UE 610, from another UE to be avoided for beamforming, or a combination thereof in a sidelink mode 2 system. Additionally or alternatively, the UE 605 may request the base station 615 for the location information of the other UEs.

In some examples, at 630 the UE 610 may transmit location information to the UE 605. For example, the UE 610 may transmit the location information indicating a zone, FL, coordinates, and the like of the UE 610 to the UE 605 as described herein with reference to FIGS. 4 and 5. In some cases, the UE 610 may transmit the location in response to the information request. In some other examples, at 635 the UE 610 may report the location information to the base station 615.

In some examples, at 640 the base station 615 may transmit the location information to the UE 605. For example, the base station 615 may indicate the location information of the UE 610, another UE to avoid, or both as described herein with reference to FIG. 4 (e.g., via DCI, MAC-CE, RRC, and the like).

At 645, the UE 605 may determine beamforming information. For example, the UE 605 may determine geographic location information of the target UE 610, geographic location of a UE to be avoided (e.g., a first direction towards another UE to avoid for beamforming), or both based on the received beamforming information.

At 650, the UE 605 may identify one or more precoding parameters. For example, the UE 605 may select beamforming parameters to beamform communications of a scheduled sidelink message towards the target UE 610, away from another UE, or a combination thereof in accordance with the determined beamforming information. In some examples, the UE 605 may identify one or more precoding parameters by determining its sequential precoder based on the geographic location information indicating a geo-location of the target UE 610. In some examples, the UE 605 may identify one or more precoding parameters by determining its sequential precoder based on the geographic location information indicating speed, location, trajectory, or the like, of the target UE 610.

At 655, the UE 605 may transmit the sidelink message using the identified one or more precoding parameters. For example, the UE 605 may schedule or be scheduled with the resources for the sidelink message (e.g., via a control message that is the same or different from messages indicating the beamforming information) and the UE 605 may transmit the sidelink message using a beam that is beamformed towards one or more target UEs, away from one or more UEs to be avoided, or a combination thereof.

Figure 7:
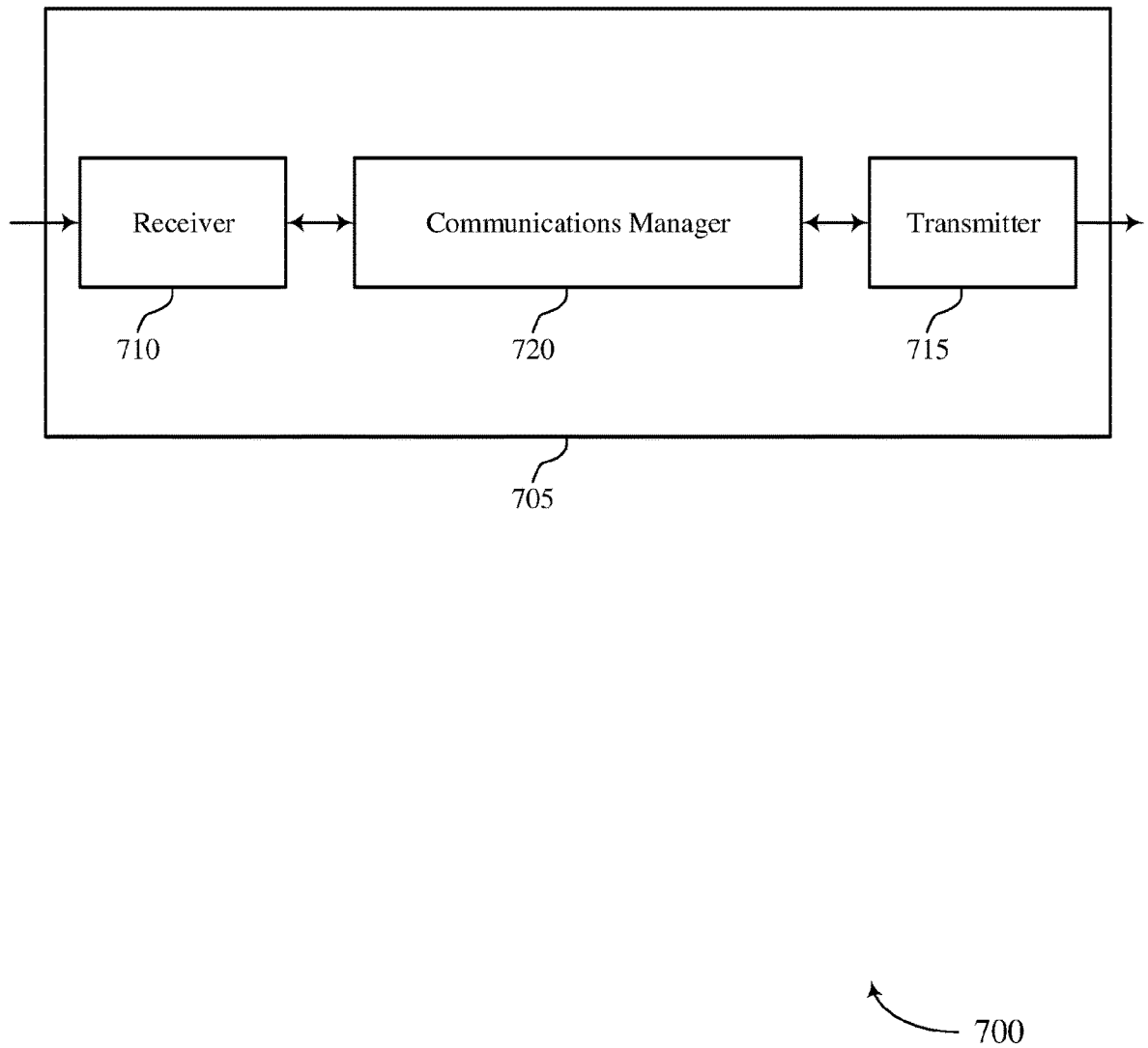
FIGS. 7 and 8 show block diagrams of devices that support techniques for precoding air-to-air sidelink communications in accordance with aspects of the present disclosure.

FIG. 7 shows a block diagram 700 of a device 705 that supports techniques for precoding air-to-air sidelink communications in accordance with aspects of the present disclosure. The device 705 may be an example of aspects of a UE 115 as described herein (e.g., a receiving UE 115, a transmitting UE 115, or a combination thereof). The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for precoding air-to-air sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for precoding air-to-air sidelink communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for precoding air-to-air sidelink communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving a message indicating geographic location information related to beamforming an air-to-air sidelink message via a sidelink channel. The communications manager 720 may be configured as or otherwise support a means for identifying one or more precoding parameters based on the geographic location information. The communications manager 720 may be configured as or otherwise support a means for transmitting, to a second UE via the sidelink channel, the air-to-air sidelink message that is precoded for transmission via a transmission beam using the one or more precoding parameters.

Additionally or alternatively, the communications manager 720 may support wireless communications at a second UE in accordance with examples as disclosed herein. For example, the communications manager 720 may be configured as or otherwise support a means for transmitting, to a first UE, a message indicating geographic location information related to beamforming an air-to-air sidelink message via a sidelink channel. The communications manager 720 may be configured as or otherwise support a means for receiving, from the first UE via the sidelink channel, the air-to-air sidelink message that is precoded for transmission using one or more precoding parameters associated with the geographic location information.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for beamforming air-to-air sidelink messages towards a target device, away from other devices, or a combination thereof, which may result in improved communications efficiency and reliability at the device 705, among other advantages.

Figure 8:
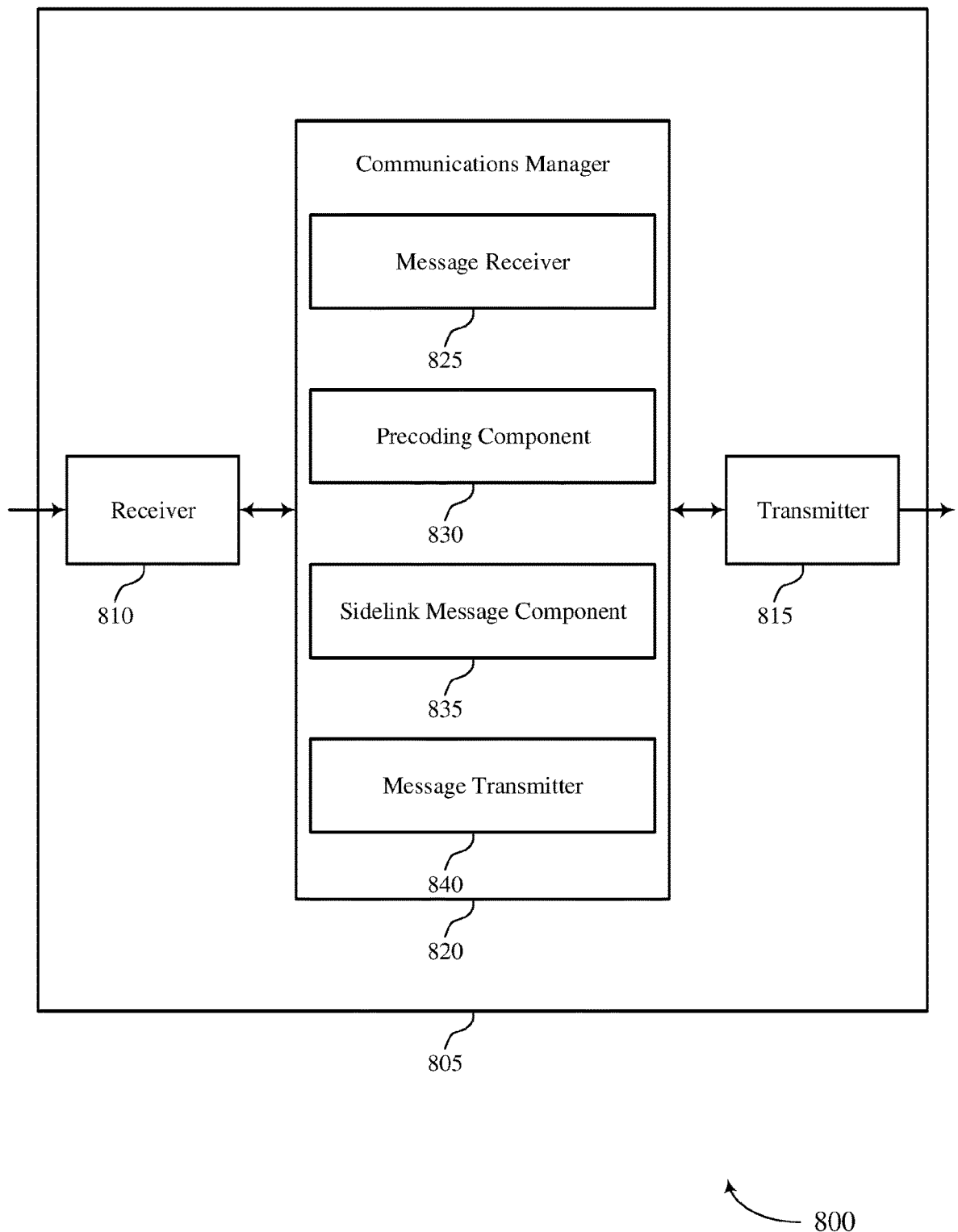

FIG. 8 shows a block diagram 800 of a device 805 that supports techniques for precoding air-to-air sidelink communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for precoding air-to-air sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for precoding air-to-air sidelink communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for precoding air-to-air sidelink communications as described herein. For example, the communications manager 820 may include a message receiver 825, a precoding component 830, a sidelink message component 835, a message transmitter 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The message receiver 825 may be configured as or otherwise support a means for receiving a message indicating geographic location information related to beamforming an air-to-air sidelink message via a sidelink channel. The precoding component 830 may be configured as or otherwise support a means for identifying one or more precoding parameters based on the geographic location information. The sidelink message component 835 may be configured as or otherwise support a means for transmitting, to a second UE via the sidelink channel, the air-to-air sidelink message that is precoded for transmission via a transmission beam using the one or more precoding parameters.

Additionally or alternatively, the communications manager 820 may support wireless communications at a second UE in accordance with examples as disclosed herein. The message transmitter 840 may be configured as or otherwise support a means for transmitting, to a first UE, a message indicating geographic location information related to beamforming an air-to-air sidelink message via a sidelink channel. The sidelink message component 835 may be configured as or otherwise support a means for receiving, from the first UE via the sidelink channel, the air-to-air sidelink message that is precoded for transmission using one or more precoding parameters associated with the geographic location information.

Figure 9:
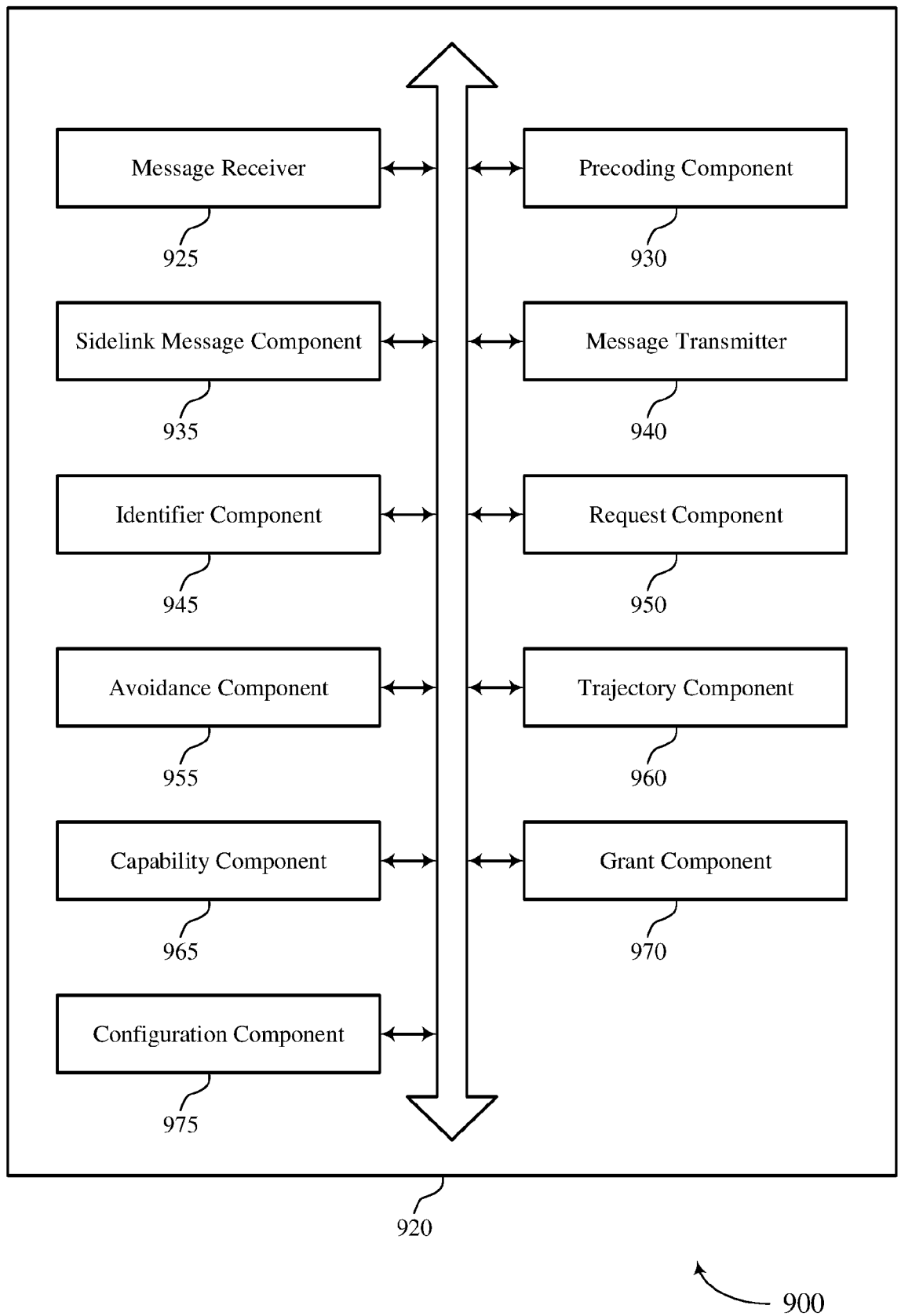
FIG. 9 shows a block diagram of a communications manager that supports techniques for precoding air-to-air sidelink communications in accordance with aspects of the present disclosure.

FIG. 9 shows a block diagram 900 of a communications manager 920 that supports techniques for precoding air-to-air sidelink communications in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for precoding air-to-air sidelink communications as described herein. For example, the communications manager 920 may include a message receiver 925, a precoding component 930, a sidelink message component 935, a message transmitter 940, an identifier component 945, a request component 950, an avoidance component 955, a trajectory component 960, a capability component 965, a grant component 970, a configuration component 975, or any combination thereof. Each of these components may communicate, directly or indirectly, with one another (e.g., via one or more buses).

The communications manager 920 may support wireless communications at a first UE in accordance with examples as disclosed herein. The message receiver 925 may be configured as or otherwise support a means for receiving a message indicating geographic location information related to beamforming an air-to-air sidelink message via a sidelink channel. The precoding component 930 may be configured as or otherwise support a means for identifying one or more precoding parameters based on the geographic location information. The sidelink message component 935 may be configured as or otherwise support a means for transmitting, to a second UE via the sidelink channel, the air-to-air sidelink message that is precoded for transmission via a transmission beam using the one or more precoding parameters.

In some examples, to support receiving the message, the message receiver 925 may be configured as or otherwise support a means for receiving the message indicating the geographic location information that is associated with the second UE.

In some examples, to support receiving the message, the message receiver 925 may be configured as or otherwise support a means for receiving the message indicating the geographic location information that is associated with a first direction to avoid when beamforming the air-to-air sidelink message.

In some examples, to support receiving the message, the identifier component 945 may be configured as or otherwise support a means for receiving the message indicating the geographic location information that identifies a two dimensional zone identifier of the second UE, a three dimensional zone identifier of the second UE, one or more geo-coordinates of the second UE, an altitude level of the second UE, or any combination thereof.

In some examples, to support receiving the message, the identifier component 945 may be configured as or otherwise support a means for receiving the message indicating the geographic location information that identifies a three dimensional zone identifier of the second UE and a size of a zone within a set of multiple zones defining a three dimensional air space.

In some examples, to support receiving the message, the identifier component 945 may be configured as or otherwise support a means for receiving the message indicating the geographic location information that identifies a first altitude level of the second UE within a set of multiple different altitude levels of an air space.

In some examples, to support receiving the message, the identifier component 945 may be configured as or otherwise support a means for receiving the message indicating the geographic location information that identifies an altitude difference between adjacent altitude levels within the air space.

In some examples, to support receiving the message, the identifier component 945 may be configured as or otherwise support a means for receiving the message indicating the geographic location information that identifies a two dimensional zone identifier of the second UE and a first altitude level of the second UE within a set of multiple different altitude levels of an air space.

In some examples, to support receiving the message, the identifier component 945 may be configured as or otherwise support a means for receiving the message indicating the geographic location information that identifies geo-coordinates of the second UE.

In some examples, to support receiving the message, the identifier component 945 may be configured as or otherwise support a means for receiving the message indicating the geographic location information that identifies a first altitude level of the second UE within a set of multiple different altitude levels of an air space associated with the geo-coordinates.

In some examples, the request component 950 may be configured as or otherwise support a means for transmitting a geographic location information request to the second UE via the sidelink channel. In some examples, the message receiver 925 may be configured as or otherwise support a means for receiving the message indicating the geographic location information based on the geographic location information request.

In some examples, to support receiving the message, the avoidance component 955 may be configured as or otherwise support a means for receiving the message indicating a first direction to avoid that identifies a two dimensional zone identifier, a three dimensional zone identifier, one or more geo-coordinates, an altitude level, or any combination thereof, associated with the first direction.

In some examples, to support receiving the message, the trajectory component 960 may be configured as or otherwise support a means for receiving the message indicating a speed of the second UE, a direction of the second UE, an expected location of the second UE, a trajectory of the second UE, or any combination thereof.

In some examples, the capability component 965 may be configured as or otherwise support a means for transmitting a capability message indicating a first quantity of different directions that the first UE is capable of simultaneously beamforming, a second quantity of different directions that the first UE is capable of avoiding during beamforming, or both, where receiving the message is based on the transmitted capability message.

In some examples, the capability message indicates an angular spread associated with the first quantity of different directions, the second quantity of different directions, or both, wherein the angular spread includes at least one of an azimuth sub-angular-spread and an elevation sub-angular-spread.

In some examples, the grant component 970 may be configured as or otherwise support a means for communicating a grant via a sidelink connection with the second UE scheduling transmission of the air-to-air sidelink message.

In some examples, the grant component 970 may be configured as or otherwise support a means for receiving a grant via an access link connection with a base station scheduling transmission of the air-to-air sidelink message.

In some examples, the configuration component 975 may be configured as or otherwise support a means for receiving the message that is a radio resource control message that semi-statically configures the geographic location information, a downlink control information message that indicates the geographic location information, a medium access control (MAC) control element message that semi-statically configures the geographic location information, a report message from the second UE indicating the geographic location information, or any combination thereof.

Additionally or alternatively, the communications manager 920 may support wireless communications at a second UE in accordance with examples as disclosed herein. The message transmitter 940 may be configured as or otherwise support a means for transmitting, to a first UE, a message indicating geographic location information related to beamforming an air-to-air sidelink message via a sidelink channel. In some examples, the sidelink message component 935 may be configured as or otherwise support a means for receiving, from the first UE via the sidelink channel, the air-to-air sidelink message that is precoded for transmission using one or more precoding parameters associated with the geographic location information.

In some examples, to support transmitting the message, the message transmitter 940 may be configured as or otherwise support a means for transmitting the message indicating the geographic location information that is associated with the second UE.

In some examples, to support transmitting the message, the message transmitter 940 may be configured as or otherwise support a means for transmitting the message indicating the geographic location information that is associated with a first direction for the first UE to avoid when beamforming the air-to-air sidelink message.

In some examples, to support transmitting the message, the identifier component 945 may be configured as or otherwise support a means for transmitting the message indicating the geographic location information that identifies a two dimensional zone identifier of the second UE, a three dimensional zone identifier of the second UE, one or more geo-coordinates of the second UE, an altitude level of the second UE, or any combination thereof.

In some examples, to support transmitting the message, the identifier component 945 may be configured as or otherwise support a means for transmitting the message indicating the geographic location information that identifies a three dimensional zone identifier of the second UE and a size of a zone within a set of multiple zones defining a three dimensional air space.

In some examples, to support transmitting the message, the identifier component 945 may be configured as or otherwise support a means for transmitting the message indicating the geographic location information that identifies a first altitude level of the second UE within a set of multiple different altitude levels of an air space.

In some examples, to support transmitting the message, the identifier component 945 may be configured as or otherwise support a means for transmitting the message indicating the geographic location information that identifies an altitude difference between adjacent altitude levels within an air space.

In some examples, to support transmitting the message, the identifier component 945 may be configured as or otherwise support a means for transmitting the message indicating the geographic location information that identifies a two dimensional zone identifier of the second UE and a first altitude level of the second UE within a set of multiple different altitude levels of an air space.

In some examples, to support transmitting the message, the identifier component 945 may be configured as or otherwise support a means for transmitting the message indicating the geographic location information that identifies geo-coordinates of the second UE.

In some examples, the request component 950 may be configured as or otherwise support a means for receiving a geographic location information request from the first UE via the sidelink channel. In some examples, the message transmitter 940 may be configured as or otherwise support a means for transmitting the message indicating the geographic location information that is a report message in response to the geographic location information request.

Figure 10:
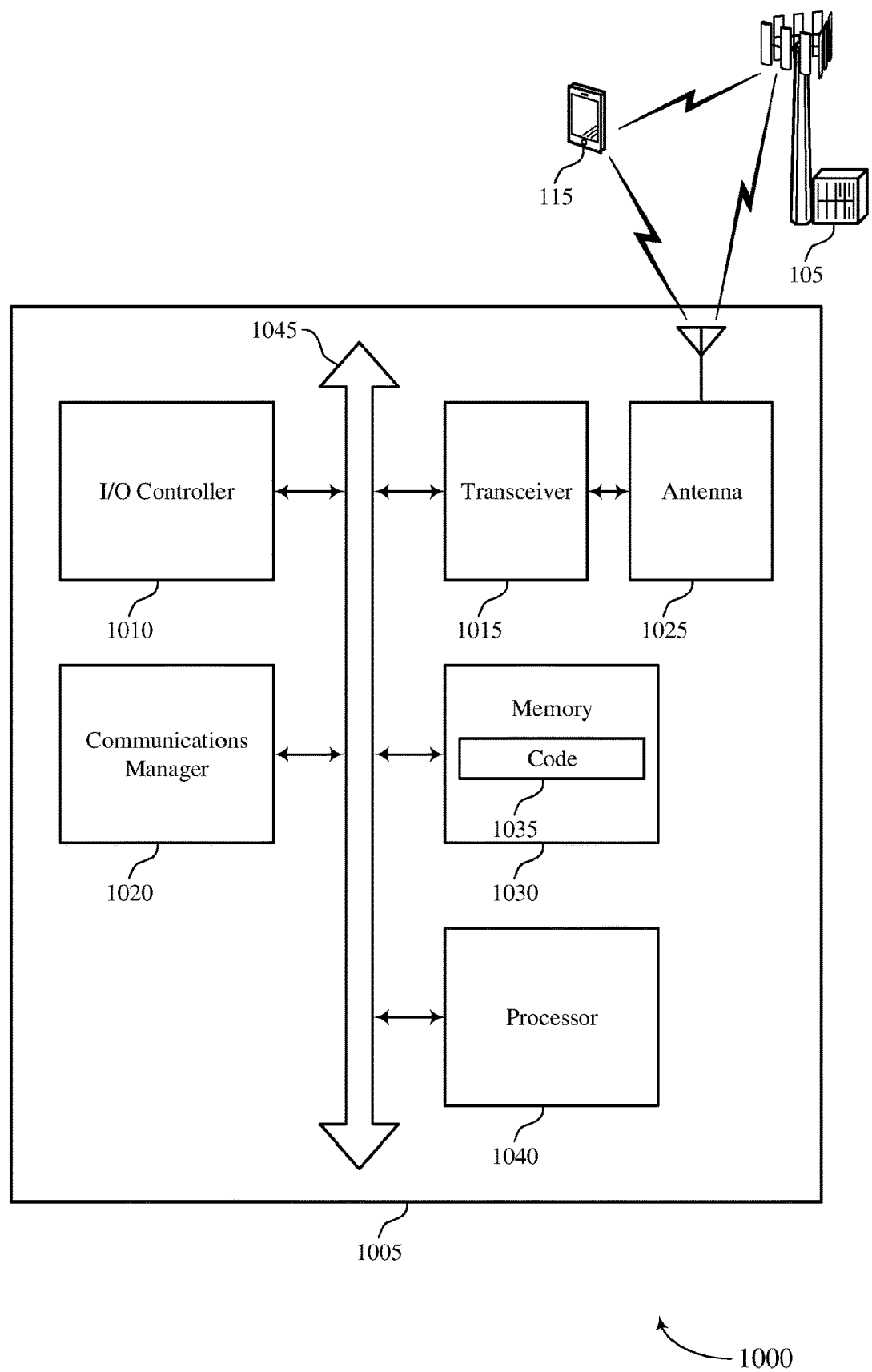
FIG. 10 shows a diagram of a system including a device that supports techniques for precoding air-to-air sidelink communications in accordance with aspects of the present disclosure.

FIG. 10 shows a diagram of a system 1000 including a device 1005 that supports techniques for precoding air-to-air sidelink communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for precoding air-to-air sidelink communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving a message indicating geographic location information related to beamforming an air-to-air sidelink message via a sidelink channel. The communications manager 1020 may be configured as or otherwise support a means for identifying one or more precoding parameters based on the geographic location information. The communications manager 1020 may be configured as or otherwise support a means for transmitting, to a second UE via the sidelink channel, the air-to-air sidelink message that is precoded for transmission via a transmission beam using the one or more precoding parameters.

Additionally or alternatively, the communications manager 1020 may support wireless communications at a second UE in accordance with examples as disclosed herein. For example, the communications manager 1020 may be configured as or otherwise support a means for transmitting, to a first UE, a message indicating geographic location information related to beamforming an air-to-air sidelink message via a sidelink channel. The communications manager 1020 may be configured as or otherwise support a means for receiving, from the first UE via the sidelink channel, the air-to-air sidelink message that is precoded for transmission using one or more precoding parameters associated with the geographic location information.

By including or configuring the communications manager 1020 in accordance with examples as described herein, the device 1005 may support techniques for beamforming air-to-air sidelink messages towards a target device, away from other devices, or a combination thereof, which may result in improved communications efficiency and reliability at the device 1005, among other advantages.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for precoding air-to-air sidelink communications as described herein, or the processor 1040 and the memory 1030 may be otherwise configured to perform or support such operations.

Figure 11:
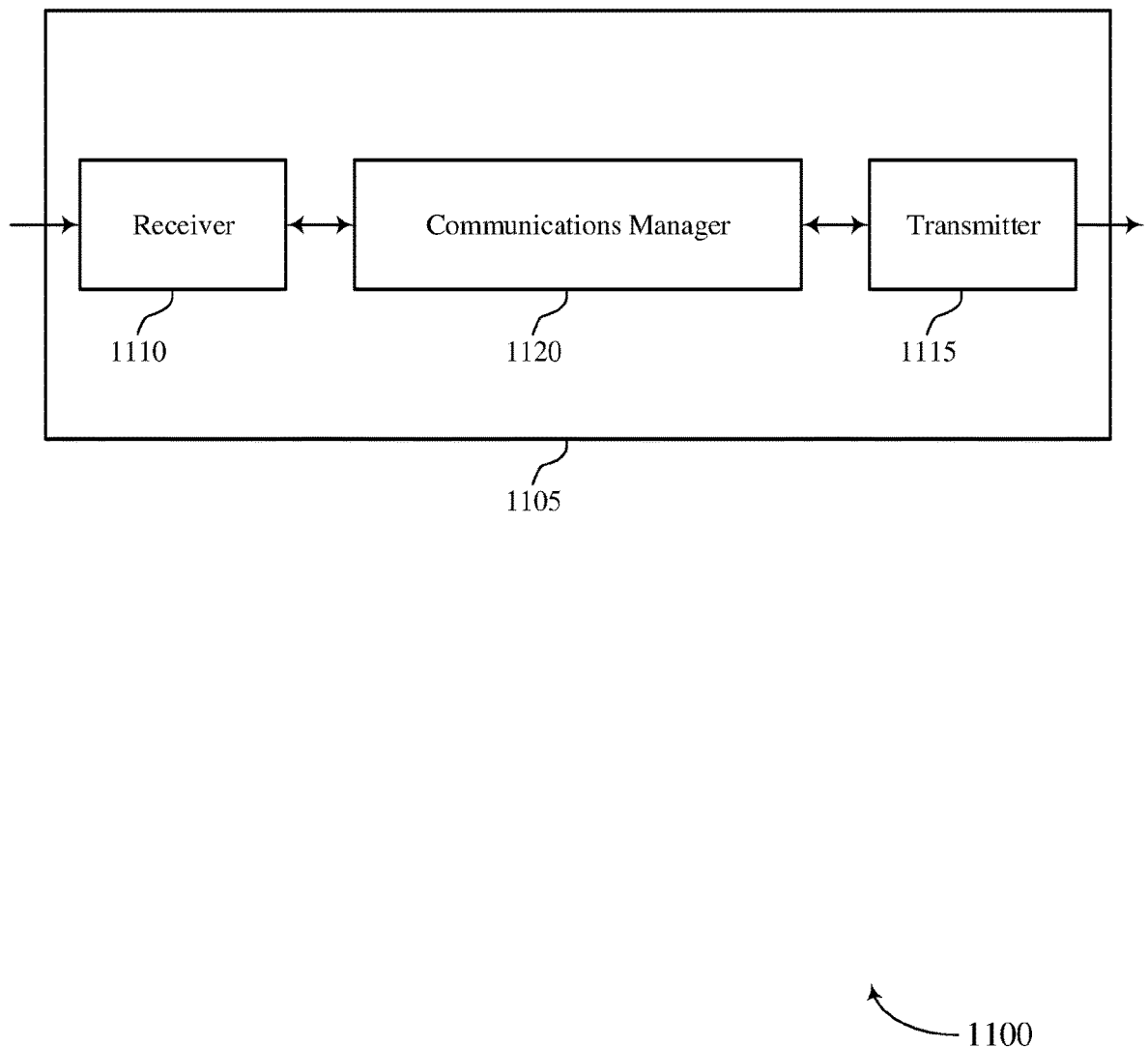
FIGS. 11 and 12 show block diagrams of devices that support techniques for precoding air-to-air sidelink communications in accordance with aspects of the present disclosure.

FIG. 11 shows a block diagram 1100 of a device 1105 that supports techniques for precoding air-to-air sidelink communications in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for precoding air-to-air sidelink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for precoding air-to-air sidelink communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for precoding air-to-air sidelink communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a first UE, a message indicating geographic location information related to beamforming an air-to-air sidelink message via a sidelink channel. The communications manager 1120 may be configured as or otherwise support a means for transmitting, to the first UE, a grant scheduling transmission of the air-to-air sidelink message from the first UE to a second UE via a sidelink channel.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for air-to-air sidelink messages, which may result in reduced processing power at the device 1105, improved communications efficiency and reliability in the system, or both, among other advantages.

Figure 12:
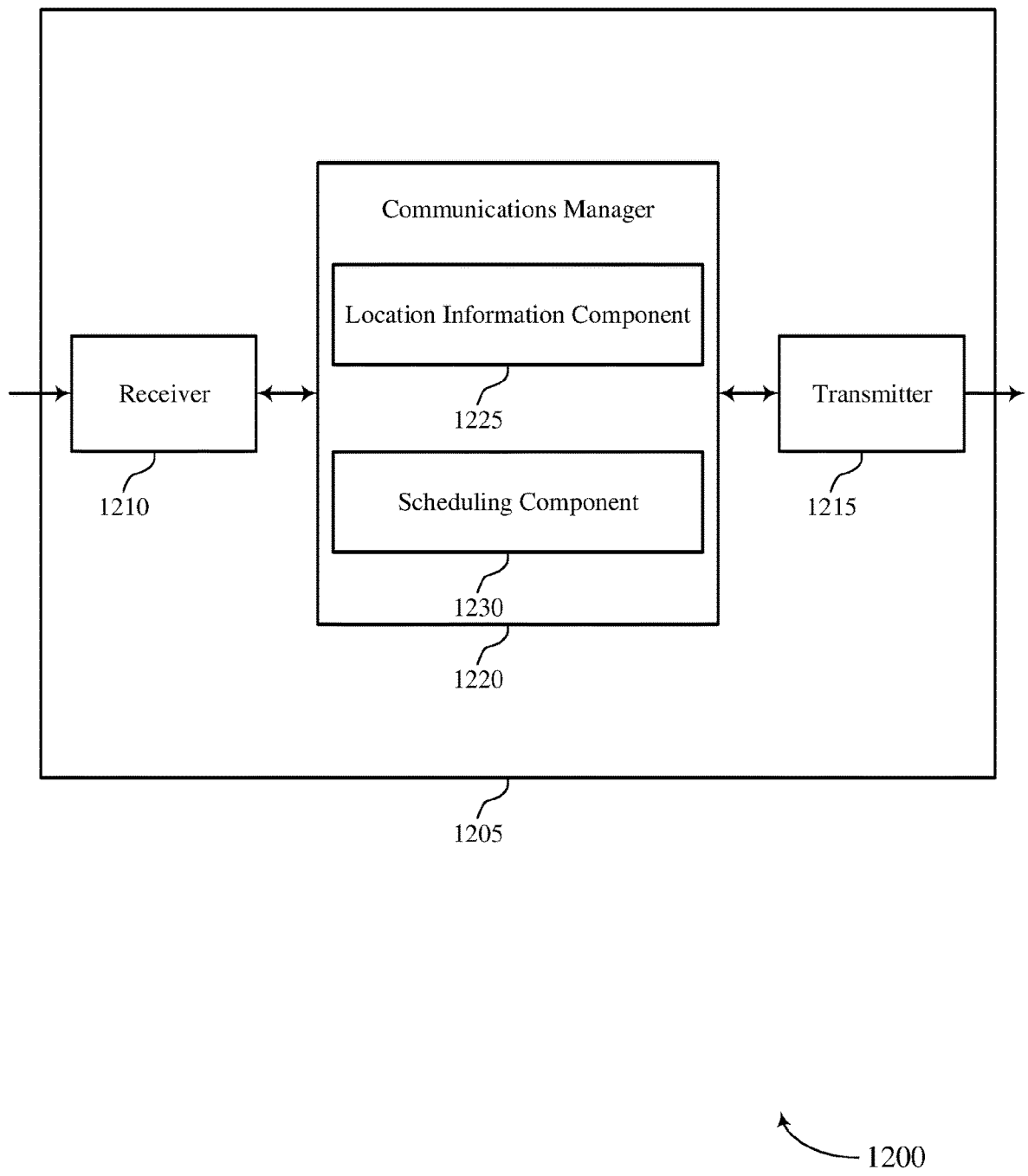

FIG. 12 shows a block diagram 1200 of a device 1205 that supports techniques for precoding air-to-air sidelink communications in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for precoding air-to-air sidelink communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for precoding air-to-air sidelink communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for precoding air-to-air sidelink communications as described herein. For example, the communications manager 1220 may include a location information component 1225 a scheduling component 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The location information component 1225 may be configured as or otherwise support a means for transmitting, to a first UE, a message indicating geographic location information related to beamforming an air-to-air sidelink message via a sidelink channel. The scheduling component 1230 may be configured as or otherwise support a means for transmitting, to the first UE, a grant scheduling transmission of the air-to-air sidelink message from the first UE to a second UE via a sidelink channel.

Figure 13:
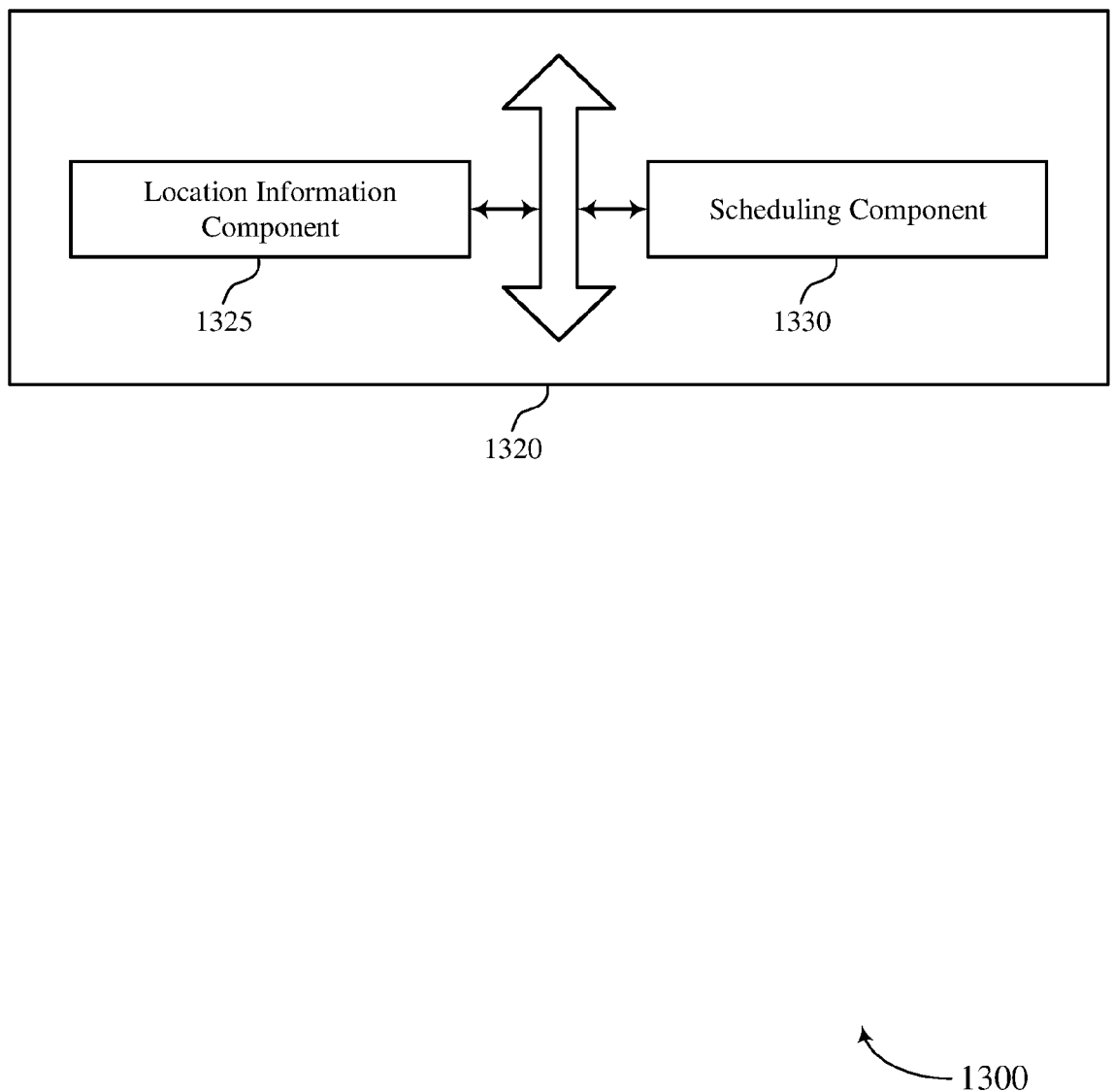
FIG. 13 shows a block diagram of a communications manager that supports techniques for precoding air-to-air sidelink communications in accordance with aspects of the present disclosure.

FIG. 13 shows a block diagram 1300 of a communications manager 1320 that supports techniques for precoding air-to-air sidelink communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for precoding air-to-air sidelink communications as described herein. For example, the communications manager 1320 may include a location information component 1325 a scheduling component 1330, or any combination thereof. Each of these components may communicate, directly or indirectly, with one another (e.g., via one or more buses).

The communications manager 1320 may support wireless communications at a base station in accordance with examples as disclosed herein. The location information component 1325 may be configured as or otherwise support a means for transmitting, to a first UE, a message indicating geographic location information related to beamforming an air-to-air sidelink message via a sidelink channel. The scheduling component 1330 may be configured as or otherwise support a means for transmitting, to the first UE, a grant scheduling transmission of the air-to-air sidelink message from the first UE to a second UE via a sidelink channel.

Figure 14:
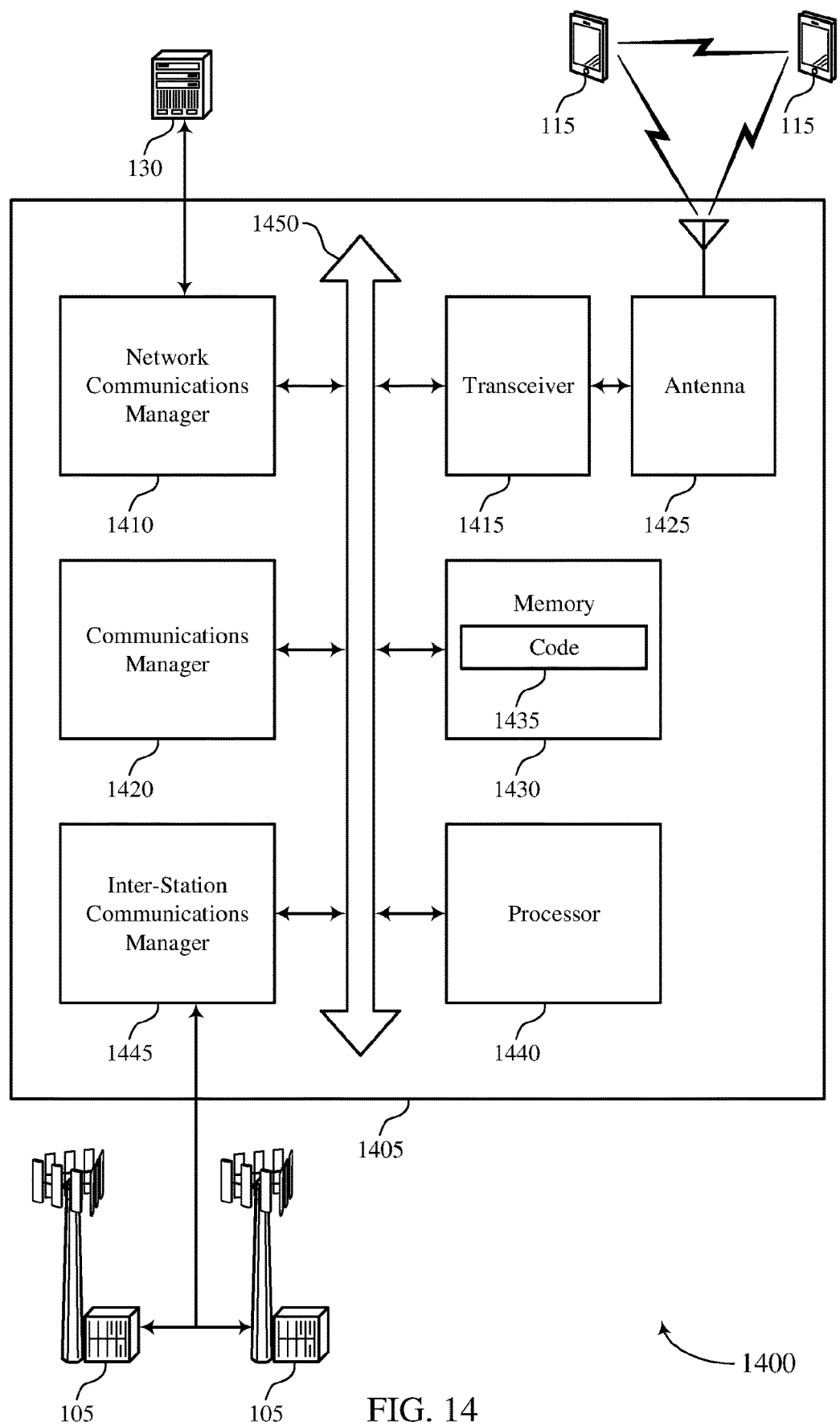
FIG. 14 shows a diagram of a system including a device that supports techniques for precoding air-to-air sidelink communications in accordance with aspects of the present disclosure.

FIG. 14 shows a diagram of a system 1400 including a device 1405 that supports techniques for precoding air-to-air sidelink communications in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for precoding air-to-air sidelink communications). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a first UE, a message indicating geographic location information related to beamforming an air-to-air sidelink message via a sidelink channel. The communications manager 1420 may be configured as or otherwise support a means for transmitting, to the first UE, a grant scheduling transmission of the air-to-air sidelink message from the first UE to a second UE via a sidelink channel.

By including or configuring the communications manager 1420 in accordance with examples as described herein, the device 1405 may support techniques for air-to-air sidelink messages, which may result in reduced processing power at the device 1405, improved communications efficiency and reliability in the system, or both, among other advantages.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for precoding air-to-air sidelink communications as described herein, or the processor 1440 and the memory 1430 may be otherwise configured to perform or support such operations.

Figure 15:
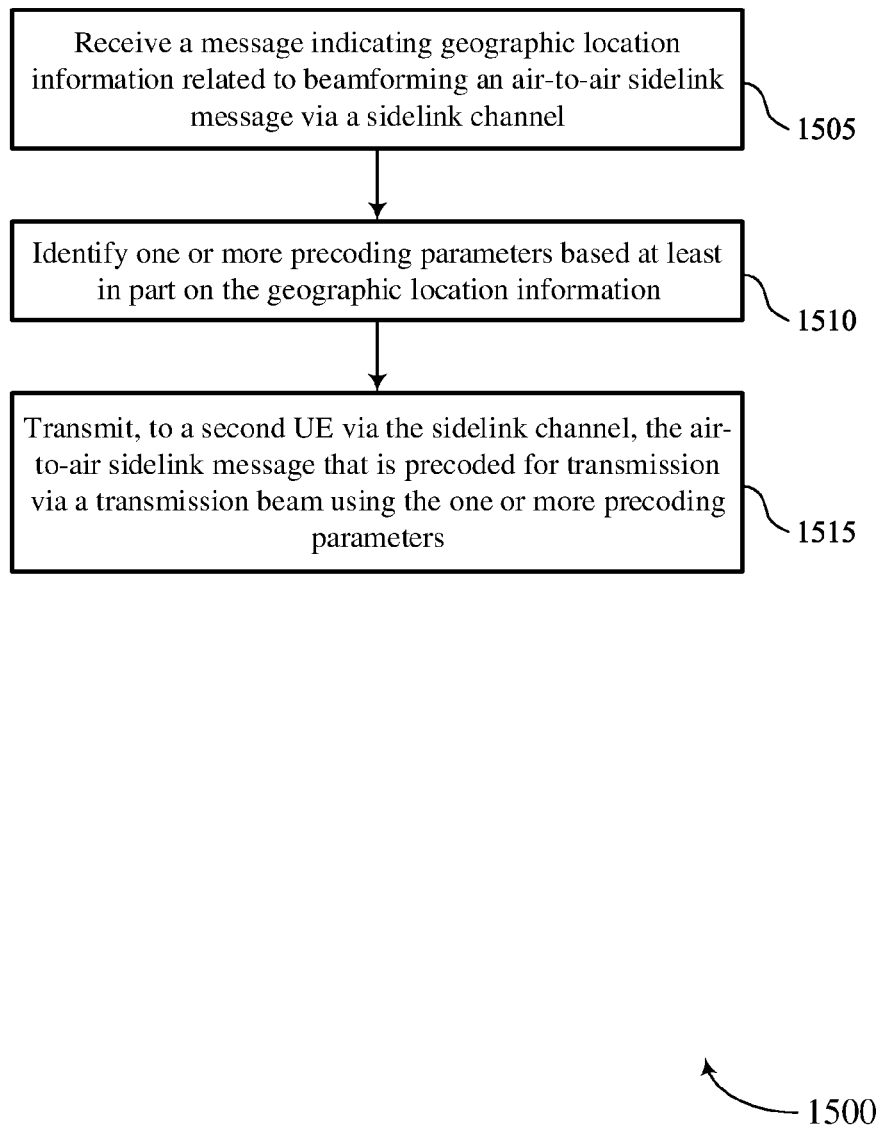
FIGS. 15 through 17 show flowcharts illustrating methods that support techniques for precoding air-to-air sidelink communications in accordance with aspects of the present disclosure.

FIG. 15 shows a flowchart illustrating a method 1500 that supports techniques for precoding air-to-air sidelink communications in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving a message indicating geographic location information related to beamforming an air-to-air sidelink message via a sidelink channel. The operations of 1505 may be performed in accordance with examples as disclosed herein. In some examples, aspects of the operations of 1505 may be performed by a message receiver 925 as described with reference to FIG. 9.

At 1510, the method may include identifying one or more precoding parameters based on the geographic location information. The operations of 1510 may be performed in accordance with examples as disclosed herein. In some examples, aspects of the operations of 1510 may be performed by a precoding component 930 as described with reference to FIG. 9.

At 1515, the method may include transmitting, to a second UE via the sidelink channel, the air-to-air sidelink message that is precoded for transmission via a transmission beam using the one or more precoding parameters. The operations of 1515 may be performed in accordance with examples as disclosed herein. In some examples, aspects of the operations of 1515 may be performed by a sidelink message component 935 as described with reference to FIG. 9.

Figure 16:
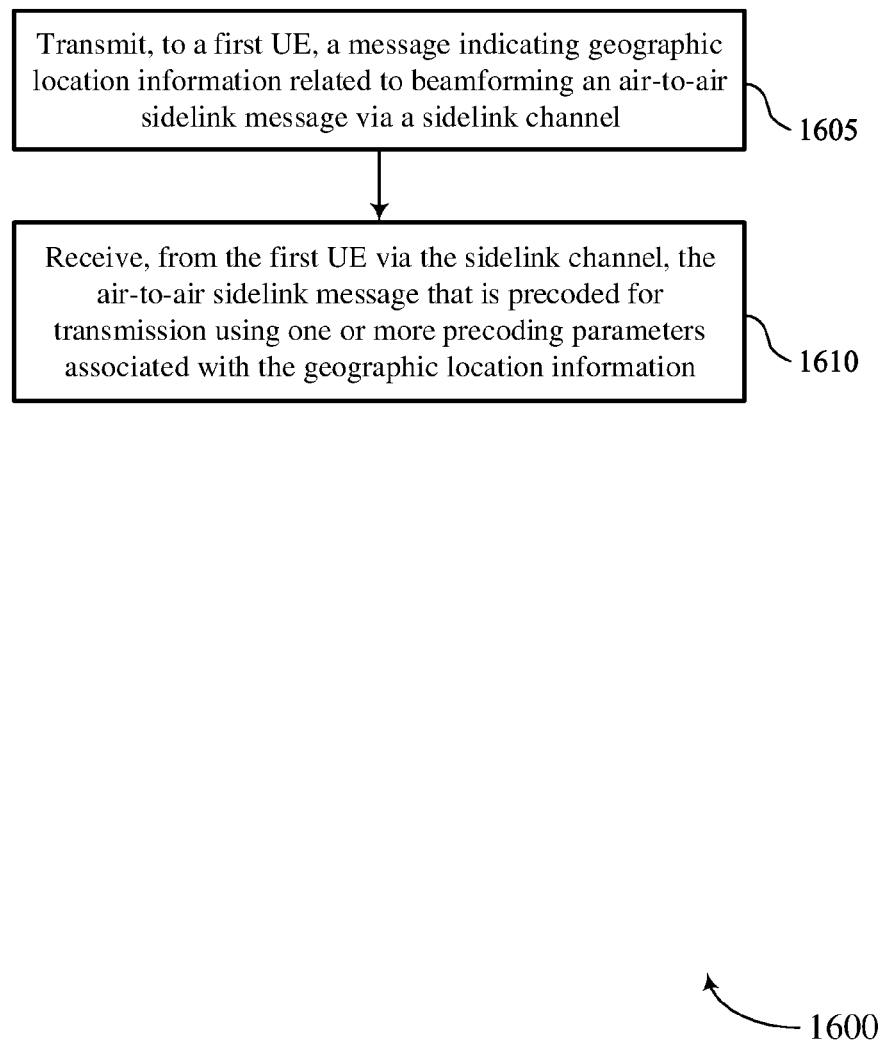

FIG. 16 shows a flowchart illustrating a method 1600 that supports techniques for precoding air-to-air sidelink communications in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include transmitting, to a first UE, a message indicating geographic location information related to beamforming an air-to-air sidelink message via a sidelink channel. The operations of 1605 may be performed in accordance with examples as disclosed herein. In some examples, aspects of the operations of 1605 may be performed by a message transmitter 940 as described with reference to FIG. 9.

At 1610, the method may include receiving, from the first UE via the sidelink channel, the air-to-air sidelink message that is precoded for transmission using one or more precoding parameters associated with the geographic location information. The operations of 1610 may be performed in accordance with examples as disclosed herein. In some examples, aspects of the operations of 1610 may be performed by a sidelink message component 935 as described with reference to FIG. 9.

Figure 17:
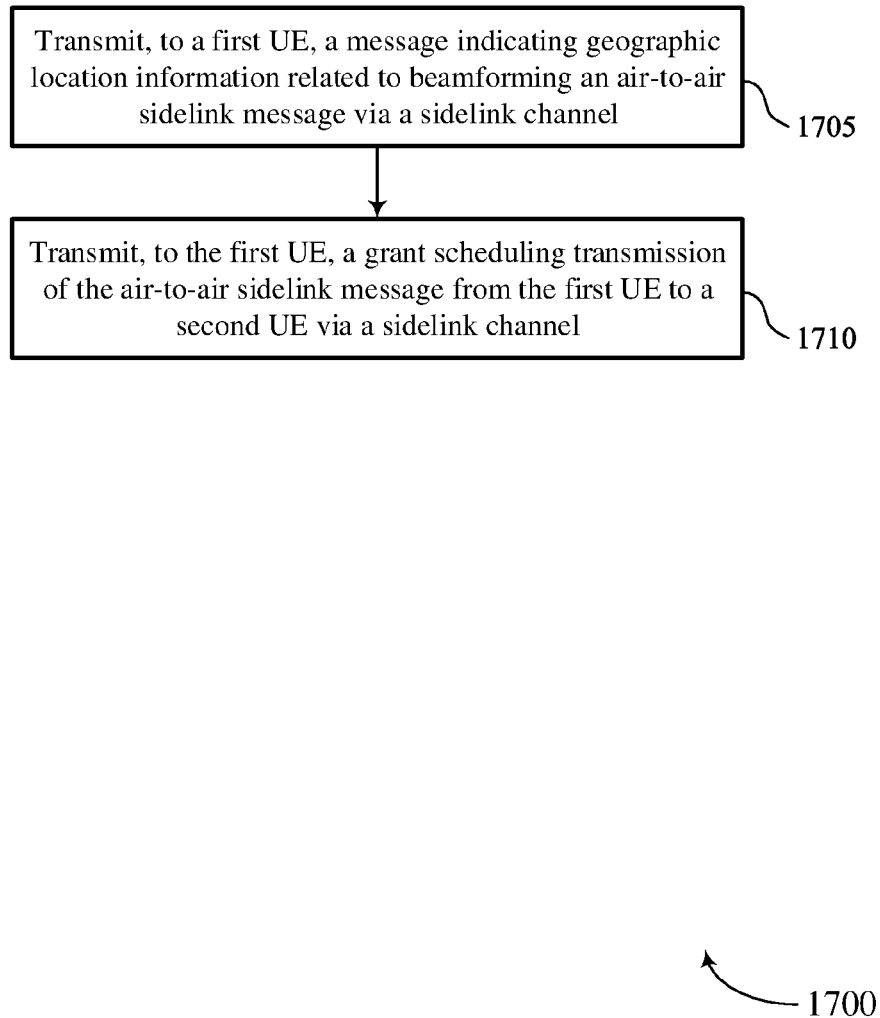

FIG. 17 shows a flowchart illustrating a method 1700 that supports techniques for precoding air-to-air sidelink communications in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to a first UE, a message indicating geographic location information related to beamforming an air-to-air sidelink message via a sidelink channel. The operations of 1705 may be performed in accordance with examples as disclosed herein. In some examples, aspects of the operations of 1705 may be performed by a location information component 1325 as described with reference to FIG. 13.

At 1710, the method may include transmitting, to the first UE, a grant scheduling transmission of the air-to-air sidelink message from the first UE to a second UE via a sidelink channel. The operations of 1710 may be performed in accordance with examples as disclosed herein. In some examples, aspects of the operations of 1710 may be performed by a scheduling component 1330 as described with reference to FIG. 13.

The following provides an overview of aspects of the present disclosure:

Aspect 1: A method for wireless communications at a first UE, comprising: receiving a message indicating geographic location information related to beamforming an air-to-air sidelink message via a sidelink channel; identifying one or more precoding parameters based at least in part on the geographic location information; and transmitting, to a second UE via the sidelink channel, the air-to-air sidelink message that is precoded for transmission via a transmission beam using the one or more precoding parameters.

Aspect 2: The method of aspect 1, wherein receiving the message comprises: receiving the message indicating the geographic location information that is associated with the second UE.

Aspect 3: The method of any of aspects 1 through 2, wherein receiving the message comprises: receiving the message indicating the geographic location information that is associated with a first direction to avoid when beamforming the air-to-air sidelink message.

Aspect 4: The method of any of aspects 1 through 3, wherein receiving the message comprises: receiving the message indicating the geographic location information that identifies a two dimensional zone identifier of the second UE, a three dimensional zone identifier of the second UE, one or more geo-coordinates of the second UE, an altitude level of the second UE, or any combination thereof.

Aspect 5: The method of any of aspects 1 through 4, wherein receiving the message comprises: receiving the message indicating the geographic location information that identifies a three dimensional zone identifier of the second UE and a size of a zone within a plurality of zones defining a three dimensional air space.

Aspect 6: The method of any of aspects 1 through 5, wherein receiving the message comprises: receiving the message indicating the geographic location information that identifies a first altitude level of the second UE within a plurality of different altitude levels of an air space.

Aspect 7: The method of aspect 6, wherein receiving the message comprises: receiving the message indicating the geographic location information that identifies an altitude difference between adjacent altitude levels within the air space.

Aspect 8: The method of any of aspects 1 through 7, wherein receiving the message comprises: receiving the message indicating the geographic location information that identifies a two dimensional zone identifier of the second UE and a first altitude level of the second UE within a plurality of different altitude levels of an air space.

Aspect 9: The method of any of aspects 1 through 8, wherein receiving the message comprises: receiving the message indicating the geographic location information that identifies geo-coordinates of the second UE.

Aspect 10: The method of aspect 9, wherein receiving the message comprises: receiving the message indicating the geographic location information that identifies a first altitude level of the second UE within a plurality of different altitude levels of an air space associated with the geo-coordinates.

Aspect 11: The method of any of aspects 1 through 10, further comprising: transmitting a geographic location information request to the second UE via the sidelink channel; and receiving the message indicating the geographic location information based at least in part on the geographic location information request.

Aspect 12: The method of any of aspects 1 through 11, wherein receiving the message comprises: receiving the message indicating a first direction to avoid that identifies a two dimensional zone identifier, a three dimensional zone identifier, one or more geo-coordinates, an altitude level, or any combination thereof, associated with the first direction.

Aspect 13: The method of any of aspects 1 through 12, wherein receiving the message comprises: receiving the message indicating a speed of the second UE, a direction of the second UE, an expected location of the second UE, a trajectory of the second UE, or any combination thereof.

Aspect 14: The method of any of aspects 1 through 13, further comprising: transmitting a capability message indicating a first quantity of different directions that the first UE is capable of simultaneously beamforming, a second quantity of different directions that the first UE is capable of avoiding during beamforming, or both, wherein receiving the message is based at least in part on the transmitted capability message.

Aspect 15: The method of aspect 14, wherein the capability message indicates an angular spread associated with the first quantity of different directions, the second quantity of different directions, or both, the angular spread includes at least one of an azimuth sub-angular-spread and an elevation sub-angular-spread.

Aspect 16: The method of any of aspects 1 through 15, further comprising: communicating a grant via a sidelink connection with the second UE scheduling transmission of the air-to-air sidelink message.

Aspect 17: The method of any of aspects 1 through 16, further comprising: receiving a grant via an access link connection with a base station scheduling transmission of the air-to-air sidelink message.

Aspect 18: The method of any of aspects 1 through 17, further comprising: receiving the message that is a radio resource control message that semi-statically configures the geographic location information, a downlink control information message that indicates the geographic location information, a medium access control (MAC) control element message that semi-statically configures the geographic location information, a report message from the second UE indicating the geographic location information, or any combination thereof.

Aspect 19: A method for wireless communications at a second UE, comprising: transmitting, to a first UE, a message indicating geographic location information related to beamforming an air-to-air sidelink message via a sidelink channel; and receiving, from the first UE via the sidelink channel, the air-to-air sidelink message that is precoded for transmission using one or more precoding parameters associated with the geographic location information.

Aspect 20: The method of aspect 19, wherein transmitting the message comprises: transmitting the message indicating the geographic location information that is associated with the second UE.

Aspect 21: The method of any of aspects 19 through 20, wherein transmitting the message comprises: transmitting the message indicating the geographic location information that is associated with a first direction for the first UE to avoid when beamforming the air-to-air sidelink message.

Aspect 22: The method of any of aspects 19 through 21, wherein transmitting the message comprises: transmitting the message indicating the geographic location information that identifies a two dimensional zone identifier of the second UE, a three dimensional zone identifier of the second UE, one or more geo-coordinates of the second UE, an altitude level of the second UE, or any combination thereof.

Aspect 23: The method of any of aspects 19 through 22, wherein transmitting the message comprises: transmitting the message indicating the geographic location information that identifies a three dimensional zone identifier of the second UE and a size of a zone within a plurality of zones defining a three dimensional air space.

Aspect 24: The method of any of aspects 19 through 23, wherein transmitting the message comprises: transmitting the message indicating the geographic location information that identifies a first altitude level of the second UE within a plurality of different altitude levels of an air space.

Aspect 25: The method of any of aspects 19 through 24, wherein transmitting the message comprises: transmitting the message indicating the geographic location information that identifies an altitude difference between adjacent altitude levels within an air space.

Aspect 26: The method of any of aspects 19 through 25, wherein transmitting the message comprises: transmitting the message indicating the geographic location information that identifies a two dimensional zone identifier of the second UE and a first altitude level of the second UE within a plurality of different altitude levels of an air space.

Aspect 27: The method of any of aspects 19 through 26, wherein transmitting the message comprises: transmitting the message indicating the geographic location information that identifies geo-coordinates of the second UE.

Aspect 28: The method of any of aspects 19 through 27, further comprising: receiving a geographic location information request from the first UE via the sidelink channel; and transmitting the message indicating the geographic location information that is a report message in response to the geographic location information request.

Aspect 29: A method for wireless communications at a base station, comprising: transmitting, to a first UE, a message indicating geographic location information related to beamforming an air-to-air sidelink message via a sidelink channel; and transmitting, to the first UE, a grant scheduling transmission of the air-to-air sidelink message from the first UE to a second UE via a sidelink channel.

Aspect 30: An apparatus for wireless communications at a first UE, comprising a processor; memory coupled with the processor; and instructions stored in the memory and executable by the processor to cause the apparatus to perform a method of any of aspects 1 through 18.

Aspect 31: An apparatus for wireless communications at a first UE, comprising at least one means for performing a method of any of aspects 1 through 18.

Aspect 32: A non-transitory computer-readable medium storing code for wireless communications at a first UE, the code comprising instructions executable by a processor to perform a method of any of aspects 1 through 18.

Aspect 33: An apparatus for wireless communications at a second UE, comprising a processor; memory coupled with the processor; and instructions stored in the memory and executable by the processor to cause the apparatus to perform a method of any of aspects 19 through 28.

Aspect 34: An apparatus for wireless communications at a second UE, comprising at least one means for performing a method of any of aspects 19 through 28.

Aspect 35: A non-transitory computer-readable medium storing code for wireless communications at a second UE, the code comprising instructions executable by a processor to perform a method of any of aspects 19 through 28.

Aspect 36: An apparatus for wireless communications at a base station, comprising a processor; memory coupled with the processor; and instructions stored in the memory and executable by the processor to cause the apparatus to perform a method of aspect 29.

Aspect 37: An apparatus for wireless communications at a base station, comprising at least one means for performing a method of aspect 29.

Aspect 38: A non-transitory computer-readable medium storing code for wireless communications at a base station, the code comprising instructions executable by a processor to perform a method of aspect 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   transmitting a capability message indicating a first quantity of different directions that the first UE is capable of simultaneously beamforming, a second quantity of different directions that the first UE is capable of avoiding during beamforming, or both;
   receiving a message indicating geographic location information related to beamforming an air-to-air sidelink message via a sidelink channel, wherein the message is received based at least in part on the capability message;
   identifying one or more precoding parameters based at least in part on the geographic location information; and
   transmitting, to a second UE via the sidelink channel, the air-to-air sidelink message that is precoded for transmission via a transmission beam using the one or more precoding parameters.

2. The method of claim 1, wherein receiving the message comprises:
   receiving the message indicating the geographic location information that is associated with the second UE.

3. The method of claim 1, wherein receiving the message comprises:
   receiving the message indicating the geographic location information that is associated with a first direction to avoid when beamforming the air-to-air sidelink message.

4. The method of claim 1, wherein receiving the message comprises:
   receiving the message indicating the geographic location information that identifies a two dimensional zone identifier of the second UE, a three dimensional zone identifier of the second UE, one or more geo-coordinates of the second UE, an altitude level of the second UE, or any combination thereof.

5. The method of claim 1, wherein receiving the message comprises:
   receiving the message indicating the geographic location information that identifies a three dimensional zone identifier of the second UE and a size of a zone within a plurality of zones defining a three dimensional air space.

6. The method of claim 1, wherein receiving the message comprises:
   receiving the message indicating the geographic location information that identifies a first altitude level of the second UE within a plurality of different altitude levels of an air space.

7. The method of claim 6, wherein receiving the message comprises:
   receiving the message indicating the geographic location information that identifies an altitude difference between adjacent altitude levels within the air space.

8. The method of claim 1, wherein receiving the message comprises:
   receiving the message indicating the geographic location information that identifies a two dimensional zone identifier of the second UE and a first altitude level of the second UE within a plurality of different altitude levels of an air space.

9. The method of claim 1, wherein receiving the message comprises:
   receiving the message indicating the geographic location information that identifies geo-coordinates of the second UE.

10. The method of claim 9, wherein receiving the message comprises:
    receiving the message indicating the geographic location information that identifies a first altitude level of the second UE within a plurality of different altitude levels of an air space associated with the geo-coordinates.

11. The method of claim 1, further comprising:
    transmitting a geographic location information request to the second UE via the sidelink channel; and
    receiving the message indicating the geographic location information based at least in part on the geographic location information request.

12. The method of claim 1, wherein receiving the message comprises:
    receiving the message indicating a first direction to avoid that identifies a two dimensional zone identifier, a three dimensional zone identifier, one or more geo-coordinates, an altitude level, or any combination thereof, associated with the first direction.

13. The method of claim 1, wherein receiving the message comprises:
    receiving the message indicating a speed of the second UE, a direction of the second UE, an expected location of the second UE, a trajectory of the second UE, or any combination thereof.

14. The method of claim 1, wherein the capability message indicates an angular spread associated with the first quantity of different directions, the second quantity of different directions, or both, wherein the angular spread includes at least one of an azimuth sub-angular-spread and an elevation sub-angular-spread.

15. The method of claim 1, further comprising:
communicating a grant via a sidelink connection with the second UE scheduling transmission of the air-to-air sidelink message.

16. The method of claim 1, further comprising:
receiving a grant via an access link connection with a base station scheduling transmission of the air-to-air sidelink message.

17. The method of claim 1, further comprising:
receiving the message that is a radio resource control message that semi-statically configures the geographic location information, a downlink control information message that indicates the geographic location information, a medium access control (MAC) control element message that semi-statically configures the geographic location information, a report message from the second UE indicating the geographic location information, or any combination thereof.

18. A method for wireless communications at a second user equipment (UE), comprising:
receiving a capability message indicating a first quantity of different directions that a first UE is capable of simultaneously beamforming, a second quantity of different directions that the first UE is capable of avoiding during beamforming, or both;
transmitting, to the first UE, a message indicating geographic location information related to beamforming an air-to-air sidelink message via a sidelink channel, wherein the message is transmitted based at least in part on the capability message; and
receiving, from the first UE via the sidelink channel, the air-to-air sidelink message that is precoded for transmission using one or more precoding parameters associated with the geographic location information.

19. The method of claim 18, wherein transmitting the message comprises:
transmitting the message indicating the geographic location information that is associated with the second UE.

20. The method of claim 18, wherein transmitting the message comprises:
transmitting the message indicating the geographic location information that is associated with a first direction for the first UE to avoid when beamforming the air-to-air sidelink message.

21. The method of claim 18, wherein transmitting the message comprises:
transmitting the message indicating the geographic location information that identifies a two dimensional zone identifier of the second UE, a three dimensional zone identifier of the second UE, one or more geo-coordinates of the second UE, an altitude level of the second UE, or any combination thereof.

22. The method of claim 18, wherein transmitting the message comprises:
transmitting the message indicating the geographic location information that identifies a three dimensional zone identifier of the second UE and a size of a zone within a plurality of zones defining a three dimensional air space.

23. The method of claim 18, wherein transmitting the message comprises:
transmitting the message indicating the geographic location information that identifies a first altitude level of the second UE within a plurality of different altitude levels of an air space.

24. The method of claim 18, wherein transmitting the message comprises:
transmitting the message indicating the geographic location information that identifies an altitude difference between adjacent altitude levels within an air space.

25. The method of claim 18, wherein transmitting the message comprises:
transmitting the message indicating the geographic location information that identifies a two dimensional zone identifier of the second UE and a first altitude level of the second UE within a plurality of different altitude levels of an air space.

26. The method of claim 18, wherein transmitting the message comprises:
transmitting the message indicating the geographic location information that identifies geo-coordinates of the second UE.

27. The method of claim 18, further comprising:
receiving a geographic location information request from the first UE via the sidelink channel; and
transmitting the message indicating the geographic location information that is a report message in response to the geographic location information request.

28. An apparatus for wireless communications at a first user equipment (UE), comprising:
a processor;
memory coupled with the processor; and
instructions stored in the memory and executable by the processor to cause the apparatus to:
transmit a capability message indicating a first quantity of different directions that the first UE is capable of simultaneously beamforming, a second quantity of different directions that the first UE is capable of avoiding during beamforming, or both;
receive a message indicating geographic location information related to beamforming an air-to-air sidelink message via a sidelink channel, wherein the message is received based at least in part on the capability message;
identify one or more precoding parameters based at least in part on the geographic location information; and
transmit, to a second UE via the sidelink channel, the air-to-air sidelink message that is precoded for transmission via a transmission beam using the one or more precoding parameters.

* * * * *